(12) United States Patent
Giannakis et al.

(10) Patent No.: US 7,672,384 B2
(45) Date of Patent: Mar. 2, 2010

(54) BANDWIDTH AND POWER EFFICIENT MULTICARRIER MULTIPLE ACCESS

(75) Inventors: Georgios B. Giannakis, Minnetonka, MN (US); Shengli Zhou, Ashford, CT (US); Pengfei Xia, Saint Paul, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 1122 days.

(21) Appl. No.: 11/070,855

(22) Filed: Mar. 2, 2005

(65) Prior Publication Data
US 2005/0220200 A1 Oct. 6, 2005

Related U.S. Application Data

(60) Provisional application No. 60/552,594, filed on Mar. 12, 2004.

(51) Int. Cl.
  *H04K 1/10* (2006.01)
(52) U.S. Cl. .................... 375/260; 375/259; 455/59
(58) Field of Classification Search ............ 375/260, 375/259; 455/59
  See application file for complete search history.

(56) References Cited

U.S. PATENT DOCUMENTS

| | | | |
|---|---|---|---|
| 5,127,051 A | 6/1992 | Chan et al. | |
| 6,088,408 A | 7/2000 | Calderbank et al. | |
| 6,188,717 B1 * | 2/2001 | Kaiser et al. ............. | 375/148 |
| 6,441,786 B1 | 8/2002 | Jasper et al. | |
| 6,449,245 B1 | 9/2002 | Ikeda et al. | |
| 6,574,202 B1 | 6/2003 | Himayat et al. | |
| 6,707,856 B1 | 3/2004 | Gardner et al. | |
| 6,850,481 B2 | 2/2005 | Wu et al. | |
| 7,009,931 B2 | 3/2006 | Ma et al. | |
| 7,308,063 B2 | 12/2007 | Priotti | |
| 7,327,795 B2 | 2/2008 | Oprea | |
| 2002/0122502 A1 | 9/2002 | El-Gamal et al. | |
| 2002/0126740 A1 * | 9/2002 | Giannakis et al. ......... | 375/143 |

(Continued)

OTHER PUBLICATIONS

3GPP Technical Report, 3G TR 25.943, "3$^{rd}$ Generation Partnership Project: Technical Specification Group (TSG) RAN WG4; Deployment Aspects," 14 pgs, 1999.

(Continued)

*Primary Examiner*—Shuwang Liu
*Assistant Examiner*—Michael R Neff
(74) *Attorney, Agent, or Firm*—Shumaker & Sieffert, P.A.

(57) ABSTRACT

Techniques are described for multicarrier multiple access wireless transmission, e.g. orthogonal frequency-division multiple access (OFDMA) transmissions, over frequency selective fading channels. The techniques are designed to maintain constant modulus transmissions for uplink while effectively mitigating intersymbol interference. Specifically, the techniques utilize non-redundant unitary precoding across OFDMA subcarriers to maintain constant modulus transmissions for uplink communications. For example, the techniques involve precoding a block of information symbols and assigning a different subcarrier for each symbol of the block. The subcarriers are selected to be equi-spaced and may be selected, for example, from a phase-shift keying constellation. The number of symbols per block is equal to the number of subcarriers assigned per user. Importantly, even with multiple subcarriers per user, the techniques enable constant modulus transmissions for uplink. Consequently, the techniques may achieve high power and bandwidth efficiency as well as improved performance over conventional OFDMA and GMC-CDMA transmissions.

38 Claims, 9 Drawing Sheets

U.S. PATENT DOCUMENTS

| | | | |
|---|---|---|---|
| 2002/0136327 | A1 | 9/2002 | El-Gamal et al. |
| 2002/0146078 | A1* | 10/2002 | Gorokhov et al. ............ 375/260 |
| 2003/0072452 | A1 | 4/2003 | Mody et al. |
| 2003/0081569 | A1 | 5/2003 | Sexton et al. |
| 2003/0169824 | A1* | 9/2003 | Chayat ........................ 375/260 |
| 2004/0013211 | A1 | 1/2004 | Lindskog et al. |
| 2004/0037214 | A1* | 2/2004 | Blasco Claret et al. ...... 370/203 |
| 2005/0058217 | A1* | 3/2005 | Sandhu et al. ............... 375/267 |

OTHER PUBLICATIONS

A. Duel-Hallen et al., "Long-Range Predication of Fading Channels," IEEE Signal Processing Magazine, pp. 62-75, May 2000.

A. Furuskar et al., "Edge: Enhanced Data Rates for GSM and TDMA/136 Evolution," IEEE Personal Communications, vol. 6, No. 3, pp. 56-66, Jun. 1999.

A. Klein et al., "Zero Forcing and Minimum Mean-Square-Error Equalization for Multiuser Detection in Code-Division Multiple-Access Channels," IEEE Transactions on Vehicular Technology, vol. 45, No. 2, pp. 276-287, May 1996.

A. Klein, "Data Detection Algorithms Specially Designed for the Downlink of CDMA Mobile Radio Systems," 1997 IEEE $47^{th}$ Vehicular Technology Conference, Phoenix, AZ, pp. 203-207, May 1997.

A. Lapidoth et al., "Fading Channels: How Perfect Need "Perfect Side Information" be?," in Procedures IEEE Information Theory Communications Workshop, pp. 36-38, Jun. 1999.

A. Ruiz et al., "Discrete Multiple Tone Modulation with Coset Coding for the Spectrally Shaped Channel," IEEE Transactions on Communications, vol. 40, No. 6, pp. 1012-1029, Jun. 1992.

A. Scaglione et al., "Filterbank Transceivers Optimizing Information Rate in block Transmissions Over Dispersive Channels," IEEE Transactions on Information Theory, vol. 45, No. 3, pp. 1019-1032, Apr. 1999.

A. Scaglione et al., "Redundant Filterbank Precoders and Equalizers Part I: Unification and Optimal Designs," IEEE Transactions on Signal Processing, vol. 47, No. 7, pp. 1988-2006, Jul. 1999.

A. Scaglione et al., "Redundant Filterbank Precoders and Equalizers Part II: Blind Channel Estimation, Synchronization, and Direct Equalization," IEEE Transactions on Signal Processing, vol. 47, No. 7, pp. 2007-2022, Jul. 1999.

A. Stamoulis et al., "Block FIR Decision-Feedback Equalizers for Filterbank Precoded Transmissions with Blind Channel Estimation Capabilities," IEEE Transactions on Communications, vol. 49, No. 1, pp. 69-83, Jan. 2001.

A.F. Naguib et al., "Increasing Data Rate Over Wireless Channels," IEEE Signal Processing Magazine, vol. 17, pp. 76-92, May 2000.

A.M. Sayeed et al., "Joint Multipath-Doppler Diversity in Mobile Wireless Communications," IEEE Transactions On Communications, vol. 47, No. 1, pp. 123-132, Jan. 1999.

A.P. Clark et al., "Adaptive Channel Estimator for an HF Radio Link," IEEE Transactions On Communications, vol. 37, No. 9, pp. 918-926, Sep. 1989.

B. Hassibi et al., "How Much Training Is Needed in Multiple-Antenna Wireless Links?" IEEE Transactions On Information Theory, vol. 49, No. 4, pp. 951-963, Apr. 2003.

B. Lu et al., "Space-Time Code Design in OFDM Systems," in Procedures Global Telecommunications Conference, vol. 2, San Francisco, CA, pp. 1000-1004, Nov. 27-Dec. 1, 2000.

B. Muquet et al., "A Subspace Based Blind and Semi-Blind Channel Identification Method for OFDM Systems," Proc. of IEEE-SP Workshop on Signal Proc. Advances in Wireless Comm., Annapolis, MD, pp. 170-173, May 9-12, 1999.

B. Muquet et al., "OFDM with Trailing Zeros Versus OFDM with Cyclic Prefix: Links, Comparisons and Application to the Hiperlan/2 System," Proc. of Intl. Conf. On Com., New Orleans, pp. 1049-1053, Jun. 2000.

B. Muquet et al., "Reduced Complexity Equalizers for Zero-Padded OFDM Transmissions," Proc. of Intl. Conf. On Acoust. Speech and Signal Proc., vol. 5, pp. 2973-2976, Istanbul, Turkey, Jun. 5-9, 2000.

B.M. Hochwald et al., "Achieving Near-Capacity on a Multiple-Antenna Channel," IEEE Transactions on Communication, vol. 51, pp. 389-399, Mar. 2003.

C. Budianu et al., "Channel Estimation for Space-Time Orthogonal Block Codes," IEEE Transactions on Signal Processing, vol. 50, No. 10, pp. 2515-2528, Oct. 2002.

C. Fragouli et al., "Finite-Alphabet Constant-Amplitude Training Sequence for Multiple-Antenna Broadband Transmissions," Procedures of IEEE International Conference on Communications, vol. 1, pp. 6-10, NY City, Apr. 28-May 1, 2002.

C. Fragouli et al., "Reduced-Complexity Training Schemes for Multiple-Antenna Broadband Transmissions," Procedure of Wireless Communications and Networking Conference, vol. 1, pp. 78-83, Mar. 17-21, 2002.

C. Tepedelenlioglu et al., "Transmitter Redundancy for Blind Estimation and Equalization of Time-and Frequency-Selective Channels," IEEE Transactions On Signal Processing, vol. 48, No. 7, pp. 2029-2043, Jul. 2000.

D. Agrawal et al., "Space-Time Coded OFDM for High Data-Rate Wireless Communication Over Wideband Channels," in Procedures on Vehicle Technology Conference, Ottawa, ON, Canada, pp. 2232-2236, May 18-21, 1998.

D.K. Borah et al., "Frequency-Selective Fading Channel Estimation with a Polynomial Time-Varying Channel Model," IEEE Transactions On Communications, vol. 47, No. 6, pp. 862-873, Jun. 1999.

D.L. Goeckel, "Coded Modulation With Non-Standard Signal Sets for Wireless OFDM Systems," in Procedures International Conference Communications, Vancouver, BC, Canada, pp. 791-795, Jun. 1999.

E. Biglieri et al., "Fading Channels: Information-Theoretic and Communications Aspects," IEEE Transactions on Information Theory, vol. 44, No. 6, pp. 2619-2692, Oct. 1998.

E. Lindskog et al, "A Transmit Diversity Scheme for Channels With Intersymbol Interference," Procedures of ICC, vol. 1, pp. 307-311, Jun. 2000.

E. Viterbo et al., "A Universal Lattice Code Decoder for Fading Channels," IEEE Transactions on Information Theory, vol. 45, No. 5, pp. 1639-1642, Jul. 1999.

F. Tufvesson et al. "Pilot Assisted Channel Estimation for OFDM in Mobile Cellular Systems," Proc. of the Vehicular Technology Conf., Phoenix, USA, vol. 3, pp. 1639-1643, May 1997.

F. Tufvesson et al., "OFDM Time and Frequency Synchronization by Spread Spectrum Pilot Technique," in Procedures $8^{th}$ Communication Theory Mini-Conference, Vancouver, BC, Canada, pp. 1-5, Jun. 1999.

F.W. Vook et al., "Transmit Diversity Schemes for Broadband Mobile Communication Systems," Procedures of IEEE VTC, vol. 6, pp. 2523-2529, 2000.

G. Caire et al., "Bit-Interleaved Coded Modulation," IEEE Transactions on Information Theory, vol. 44, No. 3, pp. 927-946, May 1998.

G. Leus et al., "MUI-Free Receiver for a Synchronous DS-CDMA System Based on Block Spreading in the Presence of Frequency-Selective Fading," IEEE Transactions on Signal Processing, vol. 48, No. 11, pp. 3175-3188, Nov. 2000.

G.B. Giannakis et al., "Basis Expansion Models and Diversity Techniques for Blind Identification and Equalization of Time-Varying Channels," Proceedings of the IEEE, vol. 86, No. 10, pp. 1969-1986, Oct. 1998.

G.B. Giannakis, "Cyclostationary Signal Analysis," The Digital Signal Processing Handbook, V.K. Madisetti and D. Williams, Eds. Boca Raton, FL: CRC, Chapter 17, 1998.

G.B. Giannakis, "Filterbanks for Blind Channel Identification and Equalization," IEEE Signal Processing Letters, vol. 4, No. 6, pp. 184-187, Jun. 1997.

G.B. Giannakis et al., "AMOUR-Generalized Multicarrier Transceivers for Blind CDMA Regardless of Multipath," IEEE Transactions on Communications, vol. 48, No. 12, pp. 2064-2076, Dec. 2000.

G.J. Foschini, "Layered Space-Time Architecture for Wireless Communication in a Fading Environment When Using Multi-Element Antennas," Bell Labs Technical Journal, vol. 1, No. 2, pp. 41-59, 1996.

G.J. Saulnier et al, "Performance of an OFDM Spread Spectrum Communication system Using Lapped Transforms," in Proc. MILCOM Conf., 1997, pp. 608-612.

G.J. Saulnier et al., "Performance of a Spread Spectrum OFDM System in a Dispersive Fading Channel with Interference," in Proc. MILCOM Conf., 1998, pp. 679-683.

G.K. Kaleh, "Channel Equalization for Block Transmission Systems," IEEE Journal on Selected Areas In Communications, vol. 13, No. 1, pp. 110-121, Jan. 1995.

H. Bolcskei et al., "Blind Channel Identification and Equalization in OFDM-Based Multiantenna Systems," IEEE Transactions on Signal Processing, vol. 50, No. 1, pp. 96-109, Jan. 2002.

H. Bolcskei et al., "Space-Frequency Coded Broadband OFDM Systems," Invited paper, presented at IEEE WCNC 2000, Chicago, pp. 1-6, Sep. 2000.

H. Bolcskei et al., "Space-Frequency Codes for Broadband Fading Channels," in International Symposium Information Theory, Washington, DC, p. 219, Jun. 2001.

H. Liu et al., "A High-Efficiency Carrier Estimator For OFDM Communications," IEEE Communications Letters, vol. 2, No. 4, pp. 104-106, Apr. 1998.

H. Sari et al., "Orthogonal Frequency-Division Multiple Access and its Application to CATV Network," Communication Theory, Vol. 9, No. 6, pp. 507-516, Nov.-Dec. 1998.

H. Sari et al., "Transmission Techniques for Digital Terrestrial TV Broadcasting," IEEE Communications Magazine, vol. 33, pp. 100-103, Feb. 1995.

H. Vikalo et al., "Optimal Training for Frequency-Selective Fading Channels," Procedures of International Conference on ASSP, Salt Lake City, Utah, vol. 4, pp. 2105-2108, May 7-11, 2001.

H. Vincent Poor, "Probability of Error in MMSE Multiuser Detection," IEEE Transactions on Information Theory, vol. 43, No. 3, pp. 858-871, May 1997.

H.A. Cirpan et al., "Chip Interleaving in Direct Sequence CDMA Systems," in Procedure of International Conference on ASSP, vol. 5, pp. 3877-3880, 1997.

I. Barhumi et al., "Optimal Training Sequences for Channel Estimation in MIMO OFDM Systems in Mobile Wireless Channels," Procedures of International Zurich Seminar on Access, Transmission, Networking of Broadband Communications, 6 pgs., ETH Zurich, Switzerland, Feb. 19-21, 2002.

I. Ghauri et al., "Linear Receivers for the DS-CDMA Downlink Exploiting Orthogonality of Spreading Sequences," Procedures of Asilomar Conference on Signals, Systems, and Computers, Pacific Grove, CA, vol. 1, pp. 650-654, Nov. 1998.

I. Koffman et al., "Broadband Wireless Access Solutions Based on OFDM Access in IEEE 802.16," IEEE Communications Magazine, vol. 40, No. 4, pp. 96-103, Apr. 2002.

I.E. Telatar, "Capacity of Multiple-Antenna Gaussian Channels," European Transactions Telecommunications, vol. 10, pp. 1-28, Nov.-Dec. 1998.

J. Baltersee et al., "Achievable Rate of MIMO Channels With Data-Aided Channel Estimation and Perfect interleaving," IEEE Journal on Selected Areas In Communications, vol. 19, No. 12, 2358-2368, Dec. 2001.

J. Boutros et al., "Signal Space Diversity: A Power and Bandwidth Efficient Diversity Technique for the Rayleigh Fading Channel," IEEE Transactions Information Theory, vol. 44, pp. 1453-1467, Jul. 1998.

J. Medbo et al., "Channel Models For Hiperlan/2 In Different Indoor Scenarios," Eur. Telecommun. Stand. Inst., Sophia-Antipolis, Valbonne, France, Norme, ETSI, document 3ER1085B, 8 pgs., Mar. 1998.

J.A. Gansman et al., "Optimum and Suboptimum Frame Synchronization for Pilot-Symbol-Assisted Modulation," IEEE Transactions on Communciations, vol. 45, No. 10, pp. 1327-1337, Oct. 1997.

J.A.C. Bingham, "Multicarrier Modulation for Data Transmission: An Idea Whose Time Has Come," IEEE Communications Magazine, pp. 5-14, May 1990.

J.H. Manton et al., "Affine Precoders for Reliable Communications," in Procedures International Conference ASSP, vol. 5, Istanbul, Turkey, pp. 2749-2752, Jun. 2000.

J.K. Cavers, "Pilot Symbol Assisted Modulation and Differential Detection in Fading and Delay Spread," IEEE Transactions on Communcations, vol. 43, No. 7, pp. 2206-2212, Jul. 1995.

J.K. Cavers, "An Analysis of Pilot Symbol Assisted Modulation for Rayleigh Fading Channels," IEEE Transactions On Vehicular Technology, vol. 40, No. 4, pp. 686-693, Nov. 1991.

J.K. Tugnait et al., "Second-Order Statistics-Based Blind Equalization of IIR Single-Input Multiple-Output Channels with Common Zeros," IEEE Transactions On Signal Processing, vol. 47, No. 1, pp. 147-157, Jan. 1999.

Jan-Jaap van de Beek et al., "On Channel Estimation in OFDM Systems," Proc. of the Vehicular Technology Conf., Chicago, USA, vol. 2, pp. 815-819, Jul. 1995.

Jiann-Ching Guey et al., "Signal Design for Transmitter Diversity Wireless Communication Systems Over Rayleigh Fading Channels," IEEE Transactions on Communications, vol. 47, No. 4, pp. 527-537, Apr. 1999.

K. Hooli et al, "Multiple Access Interference Suppression With Linear Chip Equalizers in WCDMA Downlink Receivers," Global Telecommunications Conference, Rio do Janeiro, Brazil, vol. 1 of 5, pp. 467-471, Dec. 1999.

L. Mailaender, "Low-Complexity Implementation of CDMA Downlink Equalization," 3G Mobile Communication Technologies, pp. 396-400, Mar. 2001.

L. Wei et al., "Synchronization Requirements for Multi-user OFDM on Satellite Mobile and Two-Path Rayleigh Fading Channels," IEEE Transactions on Communications, vol. 43, No. 2/3/4, pp. 887-895, Feb.-Apr. 1995.

L. Zheng et al., "Communication on the Grassmann Manifold: A Geometric Approach to the Noncoherent Multiple-Antenna Channel," IEEE Transactions On Information Theory, vol. 48, No. 2, pp. 359-383, Feb. 2002.

L.M. Davis et al., "Joint MAP Equalization and Channel Estimation for Frequency-Selective and Frequency-Flat Fast-Fading Channels," IEEE Transactions On Communications, vol. 49, No. 12, pp. 2106-2114, Dec. 2001.

M. de Courville et al., "Blind Equalization of OFDM Systems based on the Minimization of a Quadratic Criterion," Proc. of ICC, Dallas, USA, vol. 3, pp. 1318-1322, Jun. 1996.

M. Haardt et al., "The TD-CDMA Based UTRA TDD Mode," IEEE Journal on Selected Areas in Communications, vol. 18, No. 8, pp. 1375-1385, Aug. 2000.

M. Martone, "Wavelet-Based Separating Kernels for Sequence Estimation with Unknown Rapidly Time-Varying Channels," IEEE Communciations Letters, vol. 3, No. 3, pp. 78-80, Mar. 1999.

M. Medard, "The Effect Upon Channel Capacity in Wireless Communications of Perfect and Imperfect Knowledge of the Channel," IEEE Transactions on Information Theory, vol. 46, No. 3, pp. 933-946, May 2000.

M. Morelli et al., "Carrier-Frequency Estimation for Transmissions Over Selective Channels," IEEE Transactions On Communications, vol. 48, No. 9, pp. 1580-1589, Sep. 2000.

M.K. Tsatsanis et al., "Equalization of Rapidly Fading Channels: Self-Recovering Methods," IEEE Transactions on Communications, vol. 44, No. 5, pp. 619-630, May 1996.

M.K. Tsatsanis et al., "Modelling and Equalization of Rapidly Fading Channels," International Journal of Adaptive Control and Signal Processing, vol. 10, pp. 159-176, May 1996.

M.K. Tsatsanis et al., "Pilot Symbol Assisted Modulation in Frequency Selective Fading Wireless Channels," IEEE Transactions On Signal Processing, vol. 48, No. 8, pp. 2353-2365, Aug. 2000.

M.V. Clark, "Adaptive Frequency-Domain Equalization and Diversity Combining for Broadband Wireless Communications," IEEE Journal on Selected Areas in Communications, vol. 16, No. 8, pp. 1385-1395, Oct. 1998.

Magnus Sandell et al., "A Comparative Study of Pilot-Based Channel Estimators for Wireless OFDM," pp. 5-34, Sep. 1996.

Massimiliano (Max) Martone, "Wavelet-Based Separating Kernels for Sequence Estimation with Unknown Rapidly Time-Varying Channels," IEEE Communications Letter, vol. 3, No. 3, pp. 78-80, Mar. 1999.

M. Dong et al., "Optimal Design and Placement of Pilot Symbols for Channel Estimation," IEEE Transactions On Signal Processing, vol. 50, No. 12, pp. 3055-3069, Dec. 2002.

Naofal Al-Dhahir et al., "Block Transmission Over Dispersive Channels: Transmit Filter Optimization and Realization, and MMSE-DFE Receiver Performance," IEEE Transactions on Information Theory, vol. 42, No. 1, pp. 137-160, Jan. 1996.

Naofal Al-Dhahir, "Single-Carrier Frequency-Domain Equalization for Space-Time Block-Coded Transmissions Over Frequency-Selective Fading Channels," IEEE Communications Letters, vol. 5, No. 7, pp. 304-306, Jul. 2001.

N. Yee et al., "BER of Multi-Carrier CDMA in an Indoor Rician Fading Channel," Conference Record of the Twenty-Seventh Asilomar Conference on Signals, Systems and Computers, pp. 426-430, 1993.

O. Damen et al., "Lattice Code Decoder for Space-Time Codes," IEEE Communication Letters, vol. 4, No. 5, pp. 161-163, May 2000.

P. Hoeher et al., "Channel Estimation with Superimposed Pilot Sequence," in Procedure Globecom Conference, Brazil, pp. 1-5, Dec. 1999.

P. Hoeher et al., "Two-Dimensional Pilot-Symbol-Aided Channel Estimation by Wiener Filtering," Procedures of International Conference on Acoustics, Speech and Signal Processing, Munich, Germany, vol. 3, pp. 1845-1848, Apr. 1997.

P. Schramm et al., "Pilot Symbol Assisted BPSK on Rayleigh Fading Channels with Diversity: Performance Analysis and Parameter Optimization," IEEE Transactions on Communications, vol. 46, No. 12, pp. 1560-1563, Dec. 1998.

P. Schramm, "Analysis and Optimization of Pilot-Channel-Assisted BPSK for DS-CDMA Systems," IEEE Transactions Communications, vol. 46, No. 9, pp. 1122-1124, Sep. 1998.

P. Xia et al., "Bandwidth-and Power-Efficient Multicarrier Multiple Access," IEEE Transactions On Communications, vol. 51, No. 11, pp. 1828-1837, Nov. 2003.

P.H. Moose, "A Technique for Orthogonal Frequency Division Multiplexing Frequency Offset Correction," IEEE Transactions On Communications, vol. 42, No. 10, pp. 2908-2914, Oct. 1994.

P.K. Frenger et al., "Decision-Directed Coherent Detection in Multicarrier Systems on Rayleigh Fading Channels," IEEE Trans. On Vehicular Tech., vol. 48, No. 2, pp. 490-498, Mar. 1999.

Q. Sun et al., "Estimation of Continuous Flat Fading MIMO Channel," IEEE Transactions On Wireless Communications, vol. 1, No. 4, pp. 549-553, Oct. 2002.

R. Negi et al., "Pilot Tone Selection for Channel Estimation in a Mobile OFDM System," IEEE Transactions On Consumer Electronics, vol. 44, No. 3, pp. 1122-1128, Aug. 1998.

R. van Nee et al., "New High-Rate Wireless LAN Standards," IEEE Communications Magazine, vol. 37, No. 12, pp. 82-88, Dec. 1999.

R.G. Vaughan, "Polarization Diversity in Mobile Communications," IEEE Transactions On Vehicular Technologies, vol. 39, No. 3, pp. 177-186, Aug. 1990.

R.M. Gray, "On the Asymptotic Eigenvalue Distribution of Toeplitz Matrices," IEEE Transactions on Information Theory, vol. IT-18, No. 6, pp. 725-730, Nov. 1972.

R.W. Heath, Jr. et al., "Exploiting Input Cyclostationarity for Blind Channel Identification in OFDM Systems," IEEE Transactions on Signal Processing, vol. 47, No. 3, pp. 848-856, Mar. 1999.

S. Adireddy et al, "Optimal Placement of Training for Frequency-Selective Block-Fading Channels," IEEE Transactions On Information Theory, vol. 48, No. 8, pp. 2338-2353, Aug. 2002.

S. Adireddy et al., "Detection With Embedded Known Symbols: Optimal Symbol Placement and Equalization," In Procedures of International Conference ASSP, vol. 5, Istanbul, Turkey, pp. 2541-2544, Jun. 2000.

S. Adireddy et al., "Optimal Embedding of Known Symbols for OFDM," in Procedures International Conference, ASSP, vol. 4, Salt Lake City, UT, 4 pages, May 2001.

S. Baro et al., "Improved Codes for Space-Time Trellis Coded Modulation," IEEE Communication Letters, vol. 4, pp. 1-3, Jan. 2000.

S. Bhashyam et al., "Time-Selective Signaling and Reception for Communication Over Multipath Fading Channels," IEEE Transactions On Communications, vol. 48, No. 1, pp. 1-34, Jan. 2000.

S. Kaiser et al., "A Flexible Spread-Spectrum Multi-Carrier Multiple-Access System for Multi-Media Applications," in Procedures of $8^{th}$ IEEE International Symposium PIMRC, vol. 1, 1997, pp. 100-104.

S. Ohno et al., "Average-Rate Optimal PSAM Transmissions Over Time-Selective Fading Channels," IEEE Transactions On Wireless Communications, pp. 374-378, Oct. 2002.

S. Ohno et al., "Capacity Maximizing MMSE-Optimal Pilots for Wireless OFDM Over Frequency-Selective Block Rayleigh- Fading Channels," IEEE Transactions On Information Theory, pp. 2138-2145, vol. 50, No. 9, Sep. 2004.

S. Ohno et al., "Optimal Training and Redundant Precoding For Block Transmissions With Application to Wireless OFDM," IEEE Transactions on Communications, vol. 50, No. 12, pp. 2113-2123, Dec. 2002.

S. Zhou et al., "Finite-Alphabet Based Channel Estimation for OFDM and Related Multi-Carrier Systems," 2000 Conference on Information Sciences and Systems, Princeton, University, 6 pages, Mar. 15-17, 2000.

S. Zhou et al, "Frequency-Hopped Generalized MC-CDMA for Multipath and Interference Suppression," in Proc. MILCOM Conf., vol. 2, Los Angeles, CA Oct. 22-25, 2000, pp. 937-941.

S. Zhou et al., "Long Codes for Generalized FH-OFDMA Through Unknown Multipath Channels," IEEE Transactions on Communications, vol. 49, No. 4, pp. 721-733, Apr. 2001.

S. Zhou et al., "Space-Time Coding With Maximum Diversity Gains Over Frequency-Selective Fading Channels," IEEE Signal Processing Letters, vol. 8, No. 10, pp. 269-272, Oct. 2001.

S. Zhou et al., "Subspace-Based (Semi-) Blind Channel Estimation for Block Precoded Space-Time OFDM," IEEE Transactions On Signal Processing, vol. 50, No. 5, pp. 1215-1228, May 2002.

S. Zhou et al., "Chip-Interleaved Block-Spread Code Division Multiple Access," IEEE Transactions on Communications, vol. 50, No. 2, pp. 235-248, Feb. 2002.

S.A. Fechtel et al., "Optimal Parametric Feedforward Estimation of Frequency-Selective Fading Radio Channels," IEEE Transactions on Communications, vol. 42, No. 2/3/4, pp. 1639-1650, Feb./Mar./Apr. 1994.

S.M. Alamouti, "A Simple Transmit Diversity Technique For Wireless Communications," IEEE Journal on Select Areas In Communications, vol. 16, No. 8, pp. 1451-1458, Oct. 1998.

S.N. Diggavi et al., "Differential Space-Time Transmission for Frequency-Selective Channels, Procedure of $36^{th}$ Conference on Information Sciences and Systems," pp. 1-8, Princeton University, NJ, Mar. 20-22, 2002.

T. Kailath, "Measurements on Time-Variant Communication Channels," IEEE Transactions on Information Theory, vol. IT-8, pp. S229-S236, Sep. 1962.

T. Keller et al., "Adaptive Multicarrier Modulation: A Convenient Framework for Time-Frequency Processing in Wireless Communications," IEEE Procedings of the IEEE, vol. 88, No. 5, pp. 611-640, May 2000.

T.L. Marzetta, et al., "Capacity of a Mobile Multiple-Antenna Communication Link in Rayleigh Flat Fading," IEEE Transactions on Information Theory, vol. 45, pp. 1-38, Jan. 1999.

T.P. Holden et al., "A Spread-Spectrum Based Synchronization Technique for Digital Broadcast Systems," IEEE Transactions on Broadcasting, vol. 36, No. 3, pp. 185-194, Sep. 1990.

T.P. Krauss et al., "Simple MMSE Equalizers for CDMA Downlink to Restore Chip Sequence: Comparison to Zero-Forcing and RAKE," 2000 IEEE International Conference on Acoustics, Speech, and Signal Processing, vol. V of VI, Istanbul, Turkey, pp. 2865-2868, Jun. 2000.

Tai-Lai Tung et al., "Channel Estimation and Adaptive Power Allocation for Performance and Capacity Improvement of Multiple-Antenna OFDM Systems," Third IEEE Signal Processing Workshop on Signal Processing Advances in Wireless Communications, Taoyuan, Taiwan, pp. 82-85, Mar. 20-23, 2001.

U. Tureli et al., "OFDM Blind Carrier Offset Estimation: ESPIRIT," IEEE Transactions On Communications, vol. 48, No. 9, pp. 1459-1461, Sep. 2000.

V. Mignone et al., "CD3-0FDM: A Novel Demodulation Scheme for Fixed and Mobile Receivers," IEEE Transactions on Communications, vol. 44, No. 9, pp. 1144-1151, Sep. 1996.

V. Tarokh et al., "Space-Time Block Codes from Orthogonal Designs," IEEE Transactions on Information Theory, vol. 45, No. 5, pp. 1456-1467, Jul. 1999.

V. Tarokh et al., "Space-Time Codes for High Data Rate Wireless Communication: Performance Criterion and Code Construction," IEEE Transactions on Information Theory, vol. 44, No. 2, pp. 744-765, Mar. 1998.

Kozek, "On the Transfer Function Calculus for Underspread LTV Channels," IEEE Transactions On Signal Processing, vol. 45, No. 1, pp. 219-223, Jan. 1997.

W.Y. Zou et al., "COFDM: An Overview," IEEE Transactions on Broadcasting, vol. 41, No. 1, pp. 1-8, Mar. 1995.

Wen-Yi Kuo et al., "Frequency Offset Compensation of Pilot Symbol Assisted Modulation in Frequency Flat Fading," IEEE Transactions on Communications, vol. 45, No. 11, pp. 1412-1416, Nov. 1997.

Won-Joon Choi et al., "Multiple Input/Multiple Output (MIMO) Equalization for Space-Time Block Coding," IEEE Pacific Rim Conference on Communications, Computers and Signal Processing, pp. 341-344, 1999.

Won-Joon Choi et al., "Space-Time Block Codes Over Frequency Selective Rayleigh Fading Channels," IEEE VTC, vol. 5, pp. 2541-2545, 1999.

X. Giraud et al., "Algebraic Tools To Build Modulation Schemes for Fading Channels," IEEE Transactions on Information Theory, vol. 43, No. 3, pp. 938-952, May 1997.

X. Ma et al., "Maximum Diversity Transmissions Over Doubly Selective Wireless Channels," IEEE Transactions On Information Theory, vol. 49, No. 7, pp. 1832-1840, Jul. 2003.

X. Ma et al., "Maximum-Diversity Transmissions Over Time-Selective Wireless Channels," IEEE Transactions on Information Theory, pp. 497-501, 2002.

X. Ma et al., "Non-Data-Aided Carrier Offset Estimators for OFDM With Null Subcarriers: Identifiability, Algorithms, and Performance," IEEE Journal On Selected Areas In Communications, vol. 19, No. 12, pp. 2504-2515, Dec. 2001.

X. Ma et al., "Optimal Training for Block Transmissions Over Doubly Selective Wireless Fading Channels," IEEE Transactions on Signal Processing, vol. 51, No. 5, pp. 1351-1366, May 2003.

X. Ma et al., "Optimal Training for MIMO Frequency-Selective Fading Channels," IEEE Transactions on Wireless Communications, pp. 1-14.

X. Wang et al., "Iterative (Turbo) Soft Interference Cancellation and Decoding for Coded CDMA," IEEE Transactions on Communications, vol. 47, No. 7, pp. 1046-1061, Jul. 1999.

Y. Gong et al., "Space-Frequency-Time Coded OFDM for Broadband Wireless Communications," Global Telecommunications Conference, Globecom '01, IEEE, Vo. 1, pp. 519-523, Nov. 25-29, 2001.

Y. Liu et al., "Space-Time Codes Performance Criteria and Design for Frequency Selective Fading Channels," Procedures of International Conference on Communication, pp. 1-5.

Y. Xin et al., "Linear Unitary Precoders for Maximum Diversity Gains with Multiple Transmit and Receive Antennas," Procedure of $34^{th}$ Asilomar Conference on Signals, Systems, and Computers, pp. 1553-1557, Pacific Grove, CA, Oct. 29-Nov. 1, 2000.

Y. Xin et al., "Space-Time Constellation-Rotating Codes Maximizing Diversity and Coding Gains," in Procedures of Global Telecommunications Conference, Nov. 2001, pp. 455-459.

Y. Xin et al., "Space-Time Diversity Systems Based on Linear Constellation Precoding," IEEE Transactions on Wireless Communications, vol. 2, No. 2, pp. 294-309, Mar. 2003.

Y. Xin et al., "Space-Time Diversity Systems Based on Unitary Constellation-Rotating Precoders," in Procedures International Conference, Speech, Signal Process., Salt Lake City, UT, pp. 2429-2432, May 7-11, 2001.

Y. Zhang et al., "A Performance Analysis and Design of Equalization with Pilot Aided Channel Estimation," Procedures of the $47^{th}$ Vehicular Technology Conference, vol. 2, pp. 720-724, 1997.

Y. Zhang et al., "Soft Output Demodulation on Frequency-Selective Rayleigh Fading Channels Using AR Channel Models," Procedures of Global Communications Conference, vol. 1, pp. 327-331, 1997.

Ye (Geoffrey) Li et al., "Channel Estimation for OFDM Systems with Transmitter Diversity in Mobile Wireless Channels," IEEE Journal on Selected Areas in Communications, vol. 17, No. 3, pp. 461-471, Mar. 1999.

Ye (Geoffrey) Li et al., "Transmitter Diversity for OFDM Systems and Its Impact on High-Rate Data Wireless Networks," IEEE Journal on Selected Areas In Communications, vol. 17, No. 7, pp. 1233-1243, Jul. 1999.

Ye (Geoffrey) Li, "Simplified Channel Estimation for OFDM Systems With Multiple Transmit Antennas," IEEE Transactions On Wireless Communications, vol. 1, No. 1, pp. 67-75, Jan. 2002.

Yuan-Pei Lin et al., "Block Based DMT Systems With Reduced Redundancy," Procedures of International Conference on ASSP, Salt Lake City, UT, pp. 2357-2360, May 2001.

Z. Liu et al., "Linear Constellation Precoding for OFDM with Maximum Multipath Diversity and Coding Gains," IEEE Transactions On Communications, vol. 51, No. 3, pp. 416-427, Mar. 2003.

Z. Liu et al., "Space-Time Block-Coded Multiple Access Through Frequency-Selective Fading Channels," IEEE Transactions on Communications, vol. 49, No. 6, pp. 1033-1044, Jun. 2001.

Z. Liu et al., "Space-Time Coding With Transmit Antennas for Multiple Access Regardless of Frequency-Selective Multipath," Procedures of Sensor Arry and Multichannel Signal Processing Workshop, pp. 178-182, Mar. 2000.

Z. Liu et al., Space-Time-Frequency Coded OFDM Over Frequency-Selective Fading Channels, IEEE Transactions on Signal Processing, vol. 50, No. 10, pp. 2465-2476, Oct. 2002.

Z. Liu et al., "Transmit-Antennae Space-Time Block Coding for Generalized OFDM in the Presence of Unknown Multipath," IEEE Journal on Selected Areas In Communications, vol. 19, No. 7, pp. 1352-1364, Jul. 2001.

Z. Liu, et al., "Space-Time Coding for Broadband Wireless Communications," Wireless Communication and Mobile Computing, vol. 1, No. 1, pp. 35-53, Jan.-Mar. 2001.

Z. Wang et al., "Complex-Field Coding for OFDM Over Fading Wireless Channels," IEEE Transactions on Information Theory, vol. 49, No. 3, pp. 707-720, Mar. 2003.

Z. Wang et al., "Joint Coding-Precoding with Low-Complexity Turbo Decoding," IEEE Transactions on Wireless Communications, vol. XXX, No. XXX, pp. 1-11, 2003.

Z. Wang et al., "Linearly Precoded or Coded OFDM Against Wireless Channel Fades?," Third IEEE Signal Processing Workshop on Signal Processing Advances in Wireless Communications, Taoyuan, Taiwan, pp. 267-270, Mar. 20-23, 2001.

Z. Wang et al., "Optimality of Single-Carrier Zero-Padded Block Transmissions," Procedures of Wireless Communications and Networking Conference, vol. 2, pp. 660-664, 2002.

Z. Wang et al., "Wireless Multicarrier Communications: Where Fourier Meets Shannon," IEEE Signal Processing Magazine, vol. 17, pp. 29-48, May 2000.

Zhou et al., "Chip-Interleaved Block-Spread Code Division Multiple Access," 2001 Conference on Information Sciences and Systems, The Johns Hopkins University, Mar. 21-23, 2001, pp. 1-6.

* cited by examiner

TRANSMITTER

RECEIVER

BANDWIDTH AND POWER EFFICIENT MULTICARRIER MULTIPLE ACCESS

This application claims the benefit of U.S. Provisional Application Ser. No. 60/552,594, filed Mar. 12, 2004, the entire content of which is incorporated herein by reference.

STATEMENT REGARDING FEDERALLY SPONSORED RESEARCH FOR DEVELOPMENT

The invention was made with Government support under Agency Grant No. 0105612, awarded by the National Science Foundation, and with Government support under Agency Grant No. DAAD 19-01-2-011 awarded by the awarded by the Army Research Lab (ARL/CTA). The Government may have certain rights in this invention.

TECHNICAL FIELD

The invention relates to communication systems and, more particularly, transmitters for use in wireless communication systems.

BACKGROUND

In wireless mobile communications, a channel that couples a transmitter to a receiver is often time-varying due to relative transmitter-receiver motion and multipath propagation. Such a time-variation is commonly referred to as fading and may severely impair system performance. When a data rate for the system is high in relation to channel bandwidth, multipath propagation may become frequency-selective and cause intersymbol interference (ISI). By implementing inverse fast Fourier transform (IFFT) and cyclic prefix (CP) insertion at the transmitter, together with CP removal and FFT processing at the receiver, orthogonal frequency-division multiplexing (OFDM) converts frequency-selective ISI channels into a set of parallel flat fading subchannels. Each subchannel can subsequently be equalized with significantly reduced complexity. As a result, OFDM has found widespread applications in digital subscriber lines (DSL), digital audio/video broadcasting (DAB/DVB), and wireless local area networking (LAN) standards, including IEEE802.11a and Hiperlan/2.

Being OFDM's counterpart for multi-user communications, orthogonal frequency-division multiple access (OFDMA) inherits OFDM's ability to effectively mitigate ISI that arises when high-rate transmission propagate through time dispersive or frequency selective channels. Originally proposed for cable TV networks, OFDMA is now being considered for IEEE 802.16a, ETSI Broadband Radio Access Networks (BRAN), and multi-user satellite communications.

In its simplest form, each OFDMA user transmits information symbols using one complex exponential or subcarrier that retains orthogonality with other users' subcarriers when passing through multipath fading channels. As a result, multi-user interference (MUI) can be suppressed deterministically, regardless of the underlying ISI channels. In uplink applications, this one-carrier-per-user access scheme is also power efficient because each user maintains a constant modulus transmission. However, the performance of OFDMA can be significantly reduced when a user-specific channel exhibits deep fades or nulls at the information-bearing subcarrier. Error-control coding and/or frequency hopping are usually employed to rubustify performance against channel fades. Alternatively, multiple subcarriers can be assigned per user to support high data rate applications at the expense of non-constant modulus signaling. However, the multicarrier OFDMA scheme reduces efficiency of the power amplification stage at the transmitter.

SUMMARY

In general, techniques are described for multicarrier multiple access wireless transmissions, e.g. orthogonal frequency-division multiple access (OFDMA) transmissions, over frequency selective fading channels. Specifically, the techniques utilize non-redundant unitary precoding across subcarriers to maintain constant modulus transmissions for uplink. In this manner, the unitary precoded OFDMA transmissions may achieve high bandwidth and power efficiency while also improving performance over conventional OFDMA and generalized multicarrier-code-division multiple access (GMC-CDMA).

As described herein, the techniques are referred to as "unitary-precoded OFDMA (UP-OFDMA)" and the resulting transmissions are called UP-OFDMA transmissions. In general, the UP-OFDMA techniques involve non-redundant unitary precoding across OFDMA subcarriers. For example, precoding a block of information-bearing symbols may involve assigning a different subcarrier for each symbol of the block. The subcarriers for each user are selected to be equi-spaced and may be drawn, for example, from a phase-shift keying (PSK) constellation and the number of symbols per block is equal to the number of subcarriers assigned per user. Even with multiple subcarriers per user, the UP-OFDMA techniques enable constant modulus UP-OFDMA transmissions for uplink. Consequently, UP-OFDMA transmissions may achieve high power efficiency as well as high bandwidth efficiency. In addition, UP-OFDMA transmission may also achieve improved performance over conventional OFDMA and GMC-CDMA transmissions.

In one embodiment, the invention is directed to a method comprising generating a block of information-bearing symbols from a stream of information-bearing symbols applying a multi-user block-spreading code to the block of information-bearing symbols to assign a different subcarrier for each symbol of the block, and outputting an orthogonal frequency division multiple access (OFDMA) waveform for transmission through a wireless channel. The number of information-bearing symbols per block is equal to the number of subcarriers assigned per user and each information-bearing symbol is output according to the different subcarrier assigned by the block-spreading code.

In another embodiment, the invention is directed to a method comprising generating a block of information-bearing symbols from a stream of information-bearing symbols, precoding the block to produce an encoded block, assigning a different subcarrier for each symbol of the block, modulating the encoded block to produce an orthogonal frequency-division multiple access (OFDMA) waveform, and outputting the OFDMA waveform in accordance with the encoded block over a wireless channel. The number of information-bearing symbols is equal to the number of subcarriers assigned per user.

In another embodiment, the invention is directed to a wireless communication device comprising a precoder that encodes a block of information-bearing symbols and an orthogonal frequency-division multiplexing (OFDM) modulator to produce an orthogonal frequency-division multiple access (OFDMA) waveform in accordance with the encoded block for transmission over a wireless channel. A different subcarrier is assigned for each symbol of the block and the number of information-bearing symbols is equal to the number of subcarriers assigned per user.

In another embodiment, the invention is directed to a computer-readable medium containing instructions. The instructions cause a programmable processor to generate a block of information-bearing symbols from a stream of information-bearing symbols, precode the block to produce an encoded block, assign a different subcarrier for each symbol of the block, modulate the encoded block to produce an orthogonal frequency-division multiple access (OFDMA) waveform, and transmit the OFDMA waveform over a wireless channel. The number of information-bearing symbols is equal to the number of subcarriers assigned per user and each information-bearing symbol is output according to the assigned sub carrier.

In another embodiment, the invention is directed to a system comprising a transmitter that precodes a block of information-bearing symbols, assigns a different subcarrier for each symbol of the block and outputs an orthogonal frequency-division multiple access (OFDMA) waveform in accordance with the precoded block over a wireless channel, and a receiver that receives the OFDMA waveform and produces a stream of estimated symbols. The number of information-bearing symbols is equal to the number of subcarriers assigned per user and each information-bearing symbol is output according to the assigned subcarrier.

The described techniques may offer one or more advantages. Unlike conventional OFDMA with non-constant modulus transmissions that assign multiple subcarriers per user, UP-OFDMA maintains constant modulus transmission. For example, OFDMA may assign multiple subcarriers per user to support high data rate applications at the expense of non-constant modulus signaling while UP-OFDMA employs non-redundant precoding across subcarriers to maintain constant modulus transmissions, even with multiple subcarriers assigned per user. In particular, each symbol of a block of symbols is assigned a different subcarrier and the number of subcarriers assigned per user is equal the number of symbols per block. Consequently, UP-OFDMA transmissions may achieve higher power efficiency than OFDMA transmissions with multiple subcarriers assigned per user. In addition, UP-OFMDA may achieve higher bandwidth efficiency than OFDMA transmissions when both systems accommodate the maximum number of users.

Furthermore, unlike GMC-CDMA that involves redundant linear precoding across subcarriers, UP-OFDMA involves non-redundant unitary preceding across subcarriers to maintain constant modulus transmissions. Consequently, UP-OFDMA transmissions have improved bandwidth and power efficiency. In addition, UP-OFDMA transmissions may achieve improved performance over conventional OFDMA and GMC-CDMA transmissions.

The details of one or more embodiments of the invention are set forth in the accompanying drawings and the description below. Other features, objects, and advantages of the invention will be apparent from the description and drawings, and from the claims.

DETAILED DESCRIPTION

Throughout the Detailed Description bold upper letters denote matrices, while bold lowercase letters denote column vectors; ★ represents convolution and $\otimes$ represents Kronecker's product; $(\bullet)^T$ and $(\bullet)^H$ denote transpose and Hermitian transpose, respectively; $0_{M \times N}(1_{M \times N})$ denotes the all-zero (all-one) matrix with size M×N; $I_K$ denotes the K×K identity matrix, and $F_N$ stands for the N×N matrix with its (p+1, q+1)st entry given by $(1/\sqrt{N})\exp(-j2\pi pq/N)$, $\forall p, q \in [0, N-1]$; $[\bullet]_p$ denotes the (p+1)st entry of a vector, and $[\bullet]_{p,q}$ denotes the (p+1, q+1)st entry of a matrix.

Figure 1:
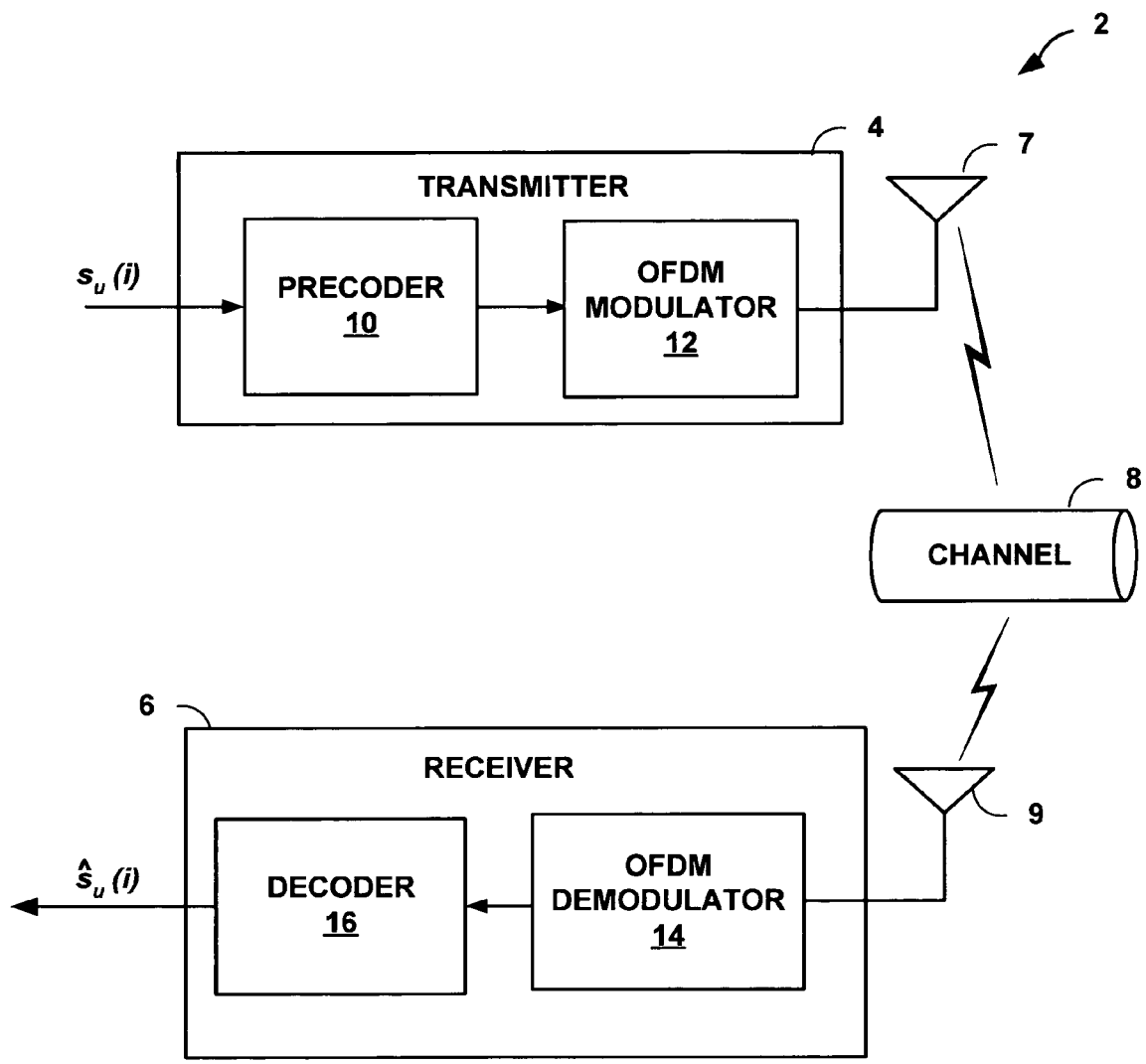
FIG. 1 is a block diagram illustrating an exemplary wireless multi-user communication system in which a transmitter and a receiver implement the unitary precoding-orthogonal frequency-division multiple access (UP-OFDMA) techniques described herein.

FIG. 1 is a block diagram illustrating multi-user communication system 2 in which transmitter 4 communicates data to receiver 6 through wireless channel 8. Transmitter 4 and receiver 6 communicate data using unitary precoding-orthogonal frequency-division multiple access (UP-OFDMA) techniques described herein. The UP-OFDMA techniques utilize non-redundant unitary precoding across OFDMA subcarriers to maintain constant modulus transmissions for uplink while retaining the ability of conventional OFDMA to effectively mitigate intersymbol interference (ISI) that arises when high-rate transmission propagate through time dispersive or frequency selective channels. As such, UP-OFDMA may be used for IEEE 802.16a, ETSI Broadband Radio Access Networks (BRAN), and multi-user satellite communications as well as IEEE 802.20 and beyond 3G applications.

The UP-OFDMA techniques may be applied to uplink and downlink transmissions, i.e., transmission from a mobile device to a base station and vice versa. However, the UP-OFDMA techniques may be particularly advantageous when applied to uplink transmissions because the techniques provide high bandwidth efficiency and constant modulus transmissions for each user. Transmitter 4 and receiver 6 may be any device configured to communicate using the UP-OFDMA techniques such as a cellular phone, a laptop or handheld computing device, a personal digital assistant (PDA), a cellular distribution station, a hub for a wireless local area network, and other devices.

In general, UP-OFDMA techniques described herein provide a power and bandwidth efficient technique for communicating data from transmitter 4 to receiver 6 through wireless channel 8. In particular, transmitter 4 utilizes non-redundant unitary preceding across OFDMA subcarriers to maintain constant modulus transmissions as will be described in detail. Unlike conventional OFDMA with non-constant modulus transmissions that assign multiple subcarriers per user and therefore require power amplifier backoff at the transmitter, UP-OFDMA maintains constant modulus transmission even with multiple subcarriers assigned per user. Thus, the UP-OFDMA techniques achieve higher power efficiency by maintaining constant modulus transmissions. Generalized multicarrier-code-division multiple access (GMC-CDMA) improve performance over conventional OFDMA but employ redundant linear precoding across subcarriers, thereby reducing the corresponding bandwidth efficiency proportional to the channels' delay spread. Moreover, GMC-CDMA transmissions that are not constant modulus also require power amplifier backoff. Since the UP-OFDMA techniques utilize non-redundant unitary precoding across subcarriers, UP-OFDMA transmissions achieve improved power and bandwidth efficiency over conventional OFDMA and GMC-CDMA transmissions. In addition, UP-OFDMA techniques also have increased performance.

In the illustrated embodiment, transmitter 4 includes precoder 10 and modulator 12. Initially, precoder 10 encodes a block of information-bearing symbols $s_u(i)$ to produce an encoded block $\tilde{s}_u(i)$ with each symbol transmitted on a distinct subcarrier. A different subcarrier is assigned for each symbol of the block. The subcarriers for each user are selected to be equi-spaced and may be drawn, for example, from a phase-shift keying (PSK) constellation and the number of symbols per block is equal to the number of subcarriers assigned per user.

Importantly, even with multiple subcarriers per user, the UP-OFDMA techniques described herein enable constant modulus UP-OFDMA transmissions for uplink. Consequently, UP-OFDMA transmissions achieve high power efficiency as well as high bandwidth efficiency. In addition, UP-OFDMA transmission may also achieve improved performance over conventional OFDMA and GMC-CDMA transmissions. The output of precoder 10 is passed to OFDM modulator 12 which applies an inverse Fast Fourier Transform (IFFT) matrix to produce an orthogonal frequency-division multiple access (OFDMA) waveform in accordance with the encoded block (herein referred to as a "UP-OFDMA waveform") for transmission over channel 8. OFDM modulator 12 may also insert a cyclic prefix for each block of information-bearing symbols so as to substantially reduce interblock interference (IBI) and serializes the output for transmission.

Receiver 6 includes OFDM demodulator 14 and decoder 16. Receiver 6 receives the UP-OFDMA waveform via antenna 9, which is typically a function of channel 8 and the UP-OFMA waveform at antenna 7. OFDM demodulator 14 samples the received waveform, buffers the discrete data, groups the data into appropriately sized blocks, discards the cyclic prefix of the incoming blocks and applies a corresponding Fast Fourier Transform (FFT) to demodulate the data. Decoder 16 receives the FFT data, i.e., the demodulated data, from OFDM demodulator 14 and forms estimates of the information-bearing symbols. In this manner, transmitter 4 and receiver 6 communicate data through channel 8 with high bandwidth and power efficiency while also improving performance over conventional OFDMA and GMC-CDMA by employing the described UP-OFDMA techniques.

To describe the UP-OFMDA techniques, a unifying system model will first be discussed. Second, the UP-OFDMA technique is described in detail. Additionally, an alternative system model based on block-spreading and de-spreading is described in FIG. 2. Next, the improvement introduced by the described UP-OFDMA techniques is illustrated through theoretical performance analysis of a UP-OFDMA system illustrated in FIG. 3. Finally, simulations are provided to show the improved performance of the UP-OFDMA transmissions.

In developing a unifying system model, a channel model is first developed. In particular, we focus on quasi-synchronous (QS) uplink transmissions over wireless channels, where mobile users follow a base station's pilot signal, to ensure that the relative asynchronism between the base station and the mobile device, e.g. transmitter 4 and receiver 6, is down to a few chips. Let $$g_u(t) = \sum_{l=0}^{\tilde{L}_u} a_{u,l}\delta(t - \tau_{u,l})$$

denote the continuous time multipath channel for user u, which consists of $\tilde{L}_u+1$ paths, each having its own fading coefficient $\alpha_{u,l}$, and distinct delay $\tau_{u,l}$. Denote with $\phi_u(t)$ and $\overline{\phi}_u(t)$ the transmit and receive filters for user u, respectively. The discrete-time baseband-equivalent channel corresponding to user can be modeled as a finite impulse response (FIR) filter with channel tap vector $h_u:=[h_u(0),h_u(1), \ldots, h_u(L)]^T$, where L is an upper bound on the channel orders of all users. Thus, the chip rate sampled FIR channel for user is given by equation (1):

$$h_u(n):=(\phi_u(t)*g_u(t)*\overline{\phi}_u(t)|_{t=nT_c}, n\in[0,L].$$

If $\tau_{max,a}$ denotes the maximum asynchronism among users, and $\tau_{max,s}$ stands for the maximum delay spread among all users' channels, the channel order L satisfies $$L \geq \left\lceil \frac{\tau_{ax,a} + \tau_{ax,s}}{T_c} \right\rceil.$$

Regardless of the number of physical paths, the discrete time channels end up with no more than L+1 nonzero taps. In a rich scattering environment, i.e., large $\tilde{L}_u$, the channel taps are approximately uncorrelated. But for sparse channels with only a few physical paths, i.e., large $\tilde{L}_u$, and relatively long delays i.e., large $\tau_{u,i}$, these channel taps in $h_u$ will be highly correlated, with $\tilde{L}_u+1$ degrees of freedom that are determined by the physical channel. The UP-OFDMA techniques described herein are suitable for both rich-scattering and sparse channels.

In single user OFDM block transmissions, the information symbols s(n) are first parsed into blocks $s(i):[s(iN), \ldots, s(iN+N-1)]^T$ of length N. The IFFT is then taken to form blocks $F_N^H s(i)$. Let the (n+1)st column of $F_N^H$ be $$f_n := \left(\frac{1}{\sqrt{N}}\right)[e^{j0}, e^{j2\pi n/N}, \ldots, e^{j2\pi n(N-1)/N}]^T$$

where vectors $$\{f_n\}_{n=0}^{N-1}$$

denote the N digital subcarriers. Each information symbol rides on a distinct subcarrier, and the resulting chip sequence is $$x(i) = \sum_{n=0}^{N-1} f_n s(iN + n).$$

To avoid interblock interference, a cyclic prefix (CP) of length L is inserted at the transmitter, and removed at receiver 6. CP insertion and removal convert linear convolution to circular convolution. Each subcarrier is an eigen function of the resulting circulant FIR channel, and thus preserves its shape after passing through the channel. The received block, after CP removal, can be written according to equation (2) where $\rho_n := \exp(j2\pi n/N)$ is the frequency of subcarrier $f_n$, $H(\rho_n)$ is the channel frequency response $$H(z) := \sum_{l=0}^{L} h(l) z^{-l}$$

evaluated at $\rho_n$, and $\overline{w}(i)$ is the additive white Gaussian noise (AWGN) with variance $\sigma_w^2$. Each information symbol can then be separated by exploiting the orthogonality among subcarriers to obtain equation (3) where $w_n(i) := f_n^H \overline{w}(i)$ has variance $\sigma_w^2$.

$$y(i) = \sum_{n=0}^{N-1} H(\rho_n) f_n s(iN + n) + \overline{w}(i) \quad (2)$$

$$r_n(i) = f_n^H y(i) = H(\rho_n) s(iN + n) + w_n(i) \quad (3)$$

It is clear from equation (3) that if the channel exhibits a deep fade at $\rho_n$, the transmitted symbol can not be recovered, which is a manifestation of the fact that uncoded OFDM loses multipath diversity. To robustify the performance against channel fades and enable multipath diversity, spread-spectrum (SS)-OFDM has been proposed. SS-OFDM is essentially a repeated transmission, whereby different copies of each information symbol are transmitted over all available N subcarriers. With $c = [c(0), \ldots, c(N-1)]^T$ denoting the spreading vector, the ith information-bearing block s(i) is formed by $s(i) = cs(i)$, and is transmitted using OFDM. If $D_h = \text{diag}[H(\rho_0), \ldots, H(\rho_{N-1})]$, then collecting $r_n(i)$ in equation $r(i) = [r_0(i), \ldots, r_{N-1}(i)]^T$ (3) into the vector (and likewise for w(i)), r(i) can be expressed according to equation (4).

$$r(i) = D_h c s(i) + w(i) \quad (4)$$

On r(i), we perform maximum-ratio combining (MRC) to obtain the symbol estimate $\hat{s}(i) = c^H D_h^H r(i)$. Upon selecting each entry of c to have constant modulus $1/\sqrt{N}$, we can express the signal-to-noise ratio (SNR) at the MRC output as equation (5), where $\sigma_s^2$ is the symbol energy. Equation (5) testifies that SS-OFDM enables full multipath diversity that can be collected at the receiver by MRC.

$$\|D_h c\|^2 \frac{\sigma_s^2}{\sigma_w^2} = \sum_{n=0}^{N-1} \frac{1}{N} |H(\rho_n)|^2 \frac{\sigma_s^2}{\sigma_w^2} = h^H h \frac{\sigma_s^2}{\sigma_w^2} \quad (5)$$

SS-OFDM only transmits one information symbol per OFDM block, which comes at the price of considerable rate loss. To share the subcarriers among multiple users, for example U users, MC-CDMA has been proposed, where different users are distinguished by their signature codes $$\{c_u\}_{u=0}^{U-1}.$$

The received vector may then be expressed according to equation (6), where $D_{h,u}$ and $s_u(i)$ are the corresponding diagonal channel matrix and information symbol for user u. When $U \geq 2$, optimal decoding requires multi-user detection to cope with multi-user interference (MUI). Besides requiring knowledge of all signature codes and user channels, the performance of MC-CDMA is upper bounded by SS-OFDM, because the latter corresponds to the best, i.e., interference-free scenario, in which all signals from other users have been correctly detected and subtracted. The performance of SS-OFDM can thus be viewed as the single-user performance bound on MC-CDMA.

$$r(i) = \sum_{u=0}^{U-1} D_{h,u} c_u s_u(i) + w(i) \quad (6)$$

To avoid MUI, OFDMA simply assigns each user a distinct subcarrier from the set $$\{f_n\}_{n=0}^{N-1}.$$

If the assigned subcarrier to user u, denoted as $\tilde{f}_u(i)$, changes from block to block, one obtains a frequency-hopped (FH)-OFDMA system. The ith transmitted chip block is thus $x_u(i) = \tilde{f}_u(i) s_u(i)$, where $s_u(i)$ is the ith symbol of user u. The uth user's signals can then be expressed according to equation (7), where $\rho_u^{(i)}$ denotes the subcarrier assigned to the ith block of user u.

$$y_u(i) = \tilde{f}_u^H(i) y(i) = H_u(\rho_u^{(i)}) s_u(i) + \tilde{f}_u^H(i) \overline{w}(i) \quad (7)$$

Referring now to the properties of OFDMA transmissions, in uplink, each OFDMA user transmits one information symbol on one assigned subcarrier, which has constant modulus. Therefore, OFDMA is power efficient in the uplink. Taking into account the CP, and supposing full user load, i.e. U=N, the bandwidth efficiency is defined as the maximum number of transmitted symbols per chip period $T_c$. Accordingly, the bandwidth efficiency of conventional OFDMA transmissions may be expressed as given in equation (8).

$$\eta_1 = \frac{N}{N+L} \quad (8)$$

As such, the bandwidth efficiency approaches 100%, when N>>L. However, for systems with moderate N and large L, bandwidth efficiency may suffer. The block size N or, alternatively, the total number of subcarriers needs to be enlarged in such cases, with each user using several subcarriers simultaneously.

As evidenced by equation (7), the performance of OFDMA degrades severely when the underlying channel undergoes deep fading around $\rho_u^{(i)}$. To cope with deep channel fades, incorporation of error-control coding, in some cases in conjunction with FH, is imperative for OFDMA. The performance of coded OFDMA is discussed in detail in FIG. 3.

Linear precoding across OFDM subcarriers has been introduced as an alternative means of mitigating channel fades in GMC-CDMA systems. In GMC-CDMA systems, J>1 subcarriers $$\{\bar{f}_{uj}\}_{j=0}^{J-1},$$

rather than one subcarrier, are assigned to user u, to transmit K>1 information symbols, simultaneously. Specifically, the ith information block $s_u(i):=[s_u(iK+0), \ldots, s_u(iK+K-1)]^T$ is precoded using a J×K tall precoder $\Theta$, where J>K, to obtain $\bar{s}_u(i)=\Theta s_u(i)$. The J×1 precoded blocks are then transmitted over the assigned J subcarriers. The redundancy offered by $\Theta$ ensures that symbols can be recovered, perfectly in the absence of noise, regardless of the channel zero locations, provided that J≧K+L. In addition to symbol recovery, it has been established that linear precoding, or complex field coding, enables the maximum multipath diversity.

Let us now check the power and bandwidth efficiency of GMC-CDMA. By using J subcarriers per user, GMC-CDMA generally does not possess constant modulus transmissions. For a maximum number of U users, UJ=U(K+L) subcarriers are needed to carry UK information symbols. Taking into account the CP, the bandwidth efficiency can be expressed according to equation (9).

$$\eta_2 = \frac{UK}{U(K+L)+L} \approx \frac{K}{K=L} \qquad (9)$$

To achieve high bandwidth efficiency, K should be chosen as large as possible. However, in practice, the choice of K may be limited by other factors. For example, the channels are slowly time varying, thus posing an upper bound on the OFDM block duration $U(K+L)T_c$, during which the channels can be viewed as time invariant so that subcarrier orthogonality is preserved. As L increases, the spectral efficiency of GMC-CDMA becomes increasingly limited.

We now describe in detail a UP-OFDMA technique that achieves improved performance over conventional OFDMA and GMC-CDMA as well as high bandwidth efficiency. Furthermore, the UP-OFDMA technique preserves constant modulus transmissions in the uplink, and is, therefore, also power efficient.

Unlike redundant precoding utilized by GMC-CDMA, the UP-OFDMA technique involves non-redundant unitary precoding across OFDMA subcarriers. Specifically, K subcarriers are allocated per user to transmit K information symbols during the ith block interval. For comparison purposes, we consider a system with the maximum number of users U=N. This multi-user system relies on P=NK subcarriers, and requires an IFFT of size P. The total duration of each transmitted block is thus $(P+L)T_c$ after CP insertion.

The ith information block is precoded by a K×K square matrix $\Theta$ to obtain $\tilde{s}_u(i)=\Theta s_u(i)$, with its entries transmitted on K distinct subcarriers. Collecting the outputs $\bar{f}_{u,k}^H(i)y(i)$ on the K subcarriers for user u into the vector $y_u(i)$, we arrive at the equivalent input-output relationship given in equation (10), where $$\Lambda_u(i) := diag[H_u(\rho_{u,0}^{(i)}), \ldots, H_u(\rho_{u,K-1}^{(i)})]$$

collects the channel frequency response samples during the ith block, and $w_u(i)$ is the resulting AWGN with variance $\sigma_w^2$ per entry. The block index i on $\Lambda_u(i)$ signifies the fact that the channel frequency is allowed to change from block to block due to channel variation and/or FH.

$$y_u(i)=\Lambda_u(i)\Theta s_u(i)+w_u(i) \qquad (10)$$

Thus, we look for a $\Theta$ that optimizes error performance, while at the same time maintains constant modulus transmissions. To achieve both of these objectives, we will assign multiple subcarriers per user and choose the precoder $\Theta$ judiciously. As such, we first assign maximally but equi-spaced subcarriers to each user in accordance with equation (11). The motivation behind equation (11) is to separate the subcarriers as much as possible so that the subcarriers are less correlated. From block to block, we take the indexes of the assigned subcarriers to increase by one. Although alternate FH patterns can be implemented in practice, equation (11) is used for simplicity herein.

$$\rho_{u,k}^{(i)}=e^{j2\pi(u+i+kN)/P}, \forall k\in[0,K-1], u\in[0,N-1]. \qquad (11)$$

The UP matrix is selected as described in J. Boutrous and E. Viterbo E. Viterbo, "Signal space diversity: A power and bandwidth efficient diversity technique for the Rayleigh fading channel," *IEEE Trans. Inform. Theory*, vol. 44, pp. 1453-1467, July 1998 and Y. Xin, Z. Wang, and G. B. Giannakis, "Space-time diversity systems based on linear constellation precoding," *IEEE Trans. Wireless Commun.*, vol. 2, pp. 294-309, March 2003, each of which are incorporated herein by reference. The UP matrix is expressed in equation (12) where $\bar{\Delta}:=diag\{1,e^{-j\pi/(2K)},\ldots,e^{-j(K-1)/(2K)}\}$ is a diagonal matrix with unit-amplitude diagonal entries.

$$\Theta=F_K\bar{\Delta} \qquad (12)$$

Notice that $\Theta$ in (12) is the conjugated version of the precoders used in Z. Wang, S. Zhou, and G. B. Giannakis, "Joint coding-precoding with low-complexity turbo decoding," *IEEE Trans. Wireless Commun.*, May 2004 and the previously referenced paper authored by Y. Xin, Z. Wang, and G. B. Giannakis. Using a conjugated version $\Theta$ does not affect performance, since conjugation does not affect the performance. Consequently, a proposition can be stated.

Proposition 1: The equi-spaced subcarrier assignment given in equation (11), together with the precoder given in equation (12), leads to perfectly constant modulus UP-OFDMA user transmissions.

The proof of Proposition 1 is given as follows. Suppose that the symbols in $s_u(i)$ are drawn from a phase-shift keying (PSK) constellation. The transmitted signal can then be written as $x_u(i)=F_P^H\Psi_u(i)\Theta s_u(i)$, where $\Psi_u(i)$ is the P×K subcarrier selection matrix, with the K columns being the K unit vectors whose nonzero entries are positioned according to the subcarriers assigned to user u. With the subcarrier assignment given in equation (11), the kth subcarrier for user u is the $[(u+I+kN)]$st column of the IFFT matrix $F_P^H$. We thus verify that the (p+1, k+1)st entry of $F_P^H\Psi_u(i)$ is given in accordance with equation (13).

$$[F_p^H \psi_u(i)]_{p,k} = \frac{1}{\sqrt{N}} e^{[j2\pi p(u+i)/P]} \frac{1}{\sqrt{K}} e^{j2\pi pk/K} \quad (13)$$

For notational brevity, let us define two constants $\omega_0 := \exp(j2\pi/P)$, and $\alpha := 1/\sqrt{N}$. With M signifying dimensionality, we construct the M×1 vector $v_M(\omega) := [1, \omega, \ldots, \omega^{M-1}]^T$, and the M×M diagonal matrix $\Delta_M(\omega) := \text{diag}[v_M(\omega)]$ from a scalar $\omega$. It follows from equation (13) that $F_P^H \Psi_u(i) = \alpha \Delta_P(\omega_0^{u+i})(1_{N \times 1} \otimes F_K^H)$. We first verify that $\Delta_P(\omega_0^{u+i}) = \Delta_P(\omega_0^i)\Delta_P(\omega_0^u)$ and $\Delta_P(\omega_0^u) = \Delta_N(\omega_0^{Ku}) \otimes \Delta_K(\omega_0)$. Using the property of Kronecker products, i.e., $(A_1 \otimes A_2)(A_3 \otimes A_4) = (A_1 A_3) \otimes (A_2 A_4)$, we obtain equation (14). Consequently, the transmitted block $x_u(i)$ can be simplified according to equation (15).

$$F_P^H \psi_u(i) = \alpha \Delta_P(\omega_0^i)[v_N(\omega_0^{Ku}) \otimes (\Delta_K(\omega_0)F_K^H)] \quad (14)$$

$$x_u(i) = F_P^H \psi_u(i)\Theta s(i) = \alpha \Delta_P(\omega_0^i)[v_N(\omega_0^{Ku}) \otimes (\Delta_K(\omega_0)\overline{\Delta})]s(i) \quad (15)$$

It is clear from equation (15) that the transmitted sequence $x_u(i)$ has constant modulus if the original sequence $s_u(i)$ does, e.g., when $s_u(i)$ is drawn from PSK constellations. Specifically, for $p=nK+k$, where $n=0, \ldots, N-1$ and $k=0, \ldots, K-1$, the $(p+1)$st entry of $x_u(i)$ is given in accordance with equation (16).

$$[x_u(i)]_p = \alpha e^{j[2\pi p(u+1)/P]} e^{-jk\pi/(2K)}[s_u(i)]_k \quad (16)$$

Next, let us evaluate the bandwidth efficiency of UP-OFDMA and compare it with other systems. With each user transmitting K symbols over P+L chips, the maximum bandwidth efficiency of UP-OFDMA is given in accordance with equation (17).

$$\eta_3 = \frac{NK}{P+L} = \frac{N}{N+L/K} \approx 1 \quad (17)$$

Comparing the UP-OFDMA bandwidth efficiency given in equation (17) with GMC-CDMA bandwidth efficiency given in equation (9), we see that the bandwidth efficiency of UP-OFDMA is generally larger than that of GMC-CDMA. However, when comparing UP-OFDMA with conventional OFDMA, one has to distinguish between two cases.

The first case occurs if both systems accommodate the maximum number of users U=N. It follows from equation (17) and equation (8) that UP-OFDMA offers a K-fold decrease in the effective channel order, and achieves higher bandwidth efficiency than the conventional OFDMA. However, in this case, UP-OFDMA has increased the number of subcarriers from N to NK, which, for the same bandwidth leads to reduced subcarrier spacing, and a longer OFDM symbol duration.

The second case occurs if both systems have the same OFDM symbol duration, and identical number of subcarriers. In this case, the UP-OFDMA system and the conventional OFDMA system entail different parameters N, which we denote, respectively, as NUP-OFMA and NOFDMA. Thus, the system parameters are related according to equation (18). Accordingly, substituting equation (18) into equation (17) verifies that UP-OFDMA has bandwidth efficiency identical to conventional OFDMA. In this case, the conventional OFDMA can either accommodate K times more users than UP-OFDMA, or assign multiple (K) subcarriers per user if the maximum number of users is kept the same. However, by allocating multiple subcarriers per user, OFDMA no longer has constant-modulus transmissions.

$$K \cdot N_{UP-OFDMA} = N_{OFDMA} \quad (18)$$

Thus, UP-OFDMA generally achieves improved bandwidth efficiency over conventional OFDMA and GMC-CDMA as stated in Proposition 2 below.

Proposition 2: In general, UP-OFDMA enjoys higher bandwidth efficiency than GMC-CDMA. When both systems accommodate the same (maximum) number of users, UP-OFDMA has higher bandwidth efficiency than OFDMA, while both systems have identical bandwidth efficiency when the total number of subcarriers is fixed.

Figure 2:
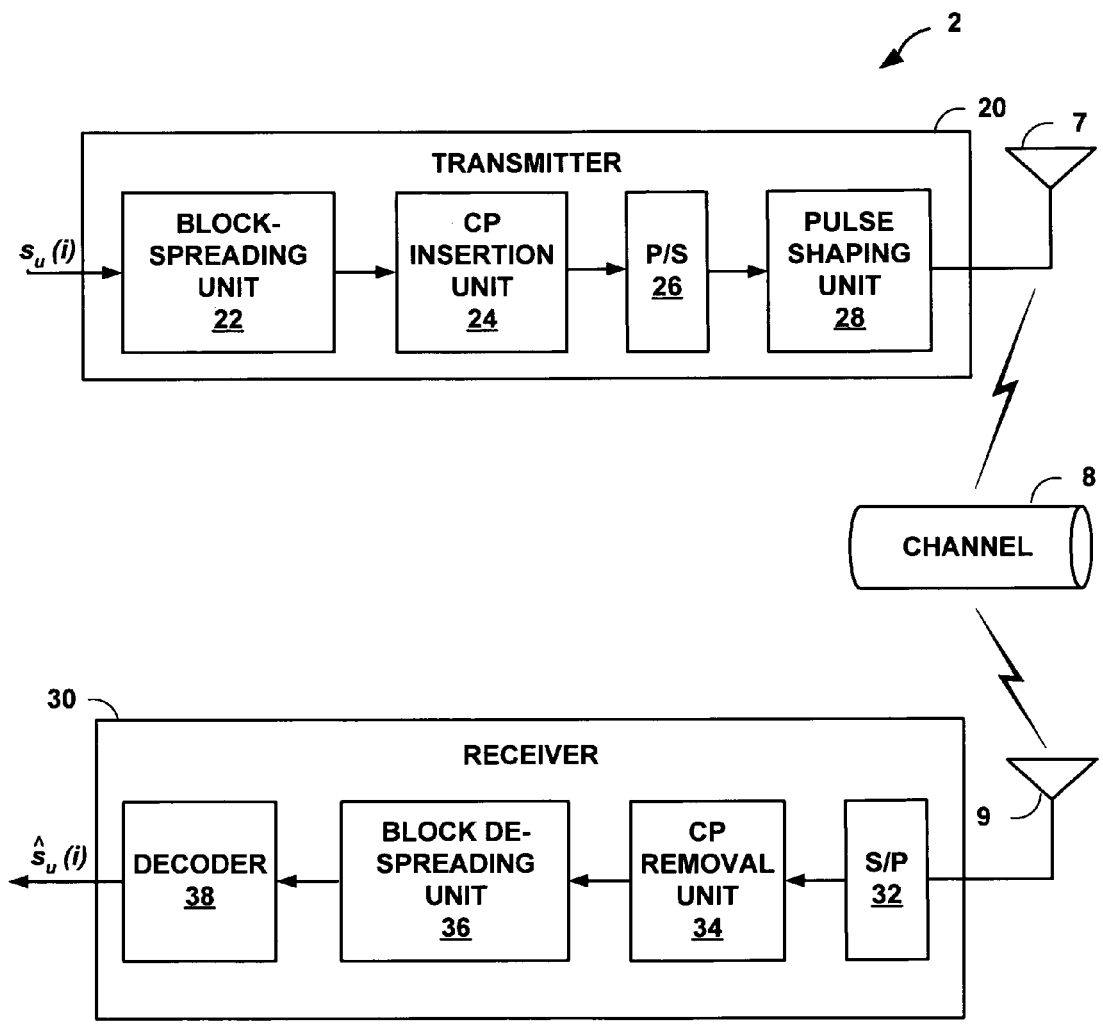
FIG. 2 is a block diagram illustrating an exemplary wireless multi-user communication system in which a transmitter and a receiver implement UP-OFDMA techniques based on block-spreading and de-spreading.

FIG. 2 is a block diagram illustrating an alternative system model of wireless multi-user communication system 2 in which a transmitter 20 and a receiver 30 transmit data through wireless channel 8 using UP-OFDMA techniques based on block-spreading and de-spreading. A unifying framework based on block-spreading and block-de-spreading has been developed, as described in Z. Wang and G. B. Giannakis, "Wireless multicarrier communications: Where Fourier meets Shannon," in *IEEE Signal Processing Mag.*, vol. 17, May 2000, pp. 29-48, incorporated herein by reference, that includes many existing CDMA schemes as special cases. UP-OFDMA techniques have been introduced from a multi-carrier point of view in FIG. 1. However, FIG. 2 describes the UP-OFDMA techniques from a block-spreading perspective.

More specifically, transmitter 20 includes block-spreading unit 22, CP insertion unit 24, parallel-to-serial (P/S) converter 26, and pulse shaping unit 28. In general, block-spreading unit 22 applies a multi-user block-spreading code to a block of information symbols $s_u(i)$ to assign a different subcarrier for each symbol of the block. The number of information symbols is equal to the number of subcarriers assigned per user. Again, the subcarriers for each user are selected to be equi-spaced according to equation (11) and may drawn from a phase-shift keying constellation. The output of block-spreading unit 22 is passed to CP insertion unit 24 which inserts a CP for each block of information symbols so as to substantially reduce IBI. P/S converter 26 serializes the output from CP insertion unit 24. Pulse shaping unit 28 outputs an OFDMA waveform from the serialized output for transmission through channel 8.

Receiver 30 includes a serial-to-parallel (S/P) converter 32, a CP removal unit 34, a block-de-spreading unit 36, and a decoder 38. Receiver 30 receives the UP-OFDMA waveform via antenna 9. Again, the UP-OFDMA waveform is typically a function of channel 8 and the UP-OFDMA waveform at antenna 7. In any case, S/P converter 32 samples the received OFDMA waveform to form appropriately sized blocks of symbols. The output of S/P converter 32 is passed to CP removal unit 34 which discards the CP of the incoming blocks. Next, block-de-spreading unit 36 applies a multi-user block-spreading matrix to deterministically separate the symbols with a block. Decoder 38 receives the separated blocks and decodes each block to form an estimate of the transmitted information symbol. As a result, transmitter 20 and receiver 30 employ a UP-OFDMA technique that enables constant modulus transmission for uplink communications. Consequently, similar to transmitter 4 and receiver 6, transmitter 20 and receiver 30 also communicate data through channel 8 with high bandwidth and power efficiency while also improving performance over conventional OFDMA and GMC-CDMA techniques.

Specifically, block-spreading unit 22 applies a P×K spreading matrix $C_u(i)$ to the K×1 symbol block $s_u(i)$ of user u. The symbol block is then transmitted after CP insertion unit 24 inserts a CP of length L for each block. The CP is removed by CP removal unit 34 at receiver 30 and multi-user separation is performed by block-de-spreading unit 36. In particular, block-de-spreading unit 36 applies a K×P block-de-spreading matrix $D_u(i)$. CP insertion at transmitter 20, together with CP removal at receiver 30 result in the following block input-output relationship given in equation (19), where $H_u$ is a P×P circulant matrix with $[H_u]_{i,j}=h_u((i-j)\bmod P)$.

$$y(i) = \sum_{u=0}^{U-1} H_u(i) C_u(i) s_u(i) + \overline{w}(i) \tag{19}$$

The output of transmitter 20 for the desired user μ is given according to equation (20).

$$y_\mu(i) := D_\mu^H(i) y(i) = \sum_{u=0}^{U-1} D_\mu^H(i) H_u(i) C_u(i) s_u(i) + D_\mu^H(i) \overline{w}(i) \tag{20}$$

Relying on the general model of equations (19) and (20), one goal is to design the block-spreading matrices $$\{C_u(i)\}_{u=0}^{U-1}$$

and the block-de-spreading matrices $$\{D_u(i)\}_{u=0}^{U-1}.$$

The objective is to guarantee deterministic multi-user separation without knowing channel 8, so that equation (20) can be simplified to equation (21).

$$y_\mu(i) = D_\mu^H(i) H_\mu(i) C_\mu(i) s_\mu(i) + D_\mu^H(i) \overline{w}(i) \tag{21}$$

One such design example is provided in S. Zhou, G. B. Giannakis, and C. Le Martret, "Chip-interleaved block spread code-division multiple access," *IEEE Trans. Commun.*, vol. 50, pp. 235-248, February 2002, hereby incorporated by reference. As another example, the UP-OFDMA described in FIG. 1 fits into this general transceiver model. Accordingly, the (de)spreading matrices can be expressed as given in equations (22) and (23).

$$C_u(i) := \alpha \Delta_P(\omega_0^i)[v_N(\omega_0^{K_u}) \otimes (\Delta_K(\omega_0)\overline{A})] \tag{22}$$

$$D_u(i) := \alpha \Delta_P(\omega_0^i)[v_N(\omega_0^{K_u}) \otimes (\Delta_K(\omega_0)F_K^H)] \tag{23}$$

The diagonal matrix $\Delta_P(\omega_0^i)$ in $C_u(i)$ can be viewed as a long scrambling code that changes from block to block.

It can be readily checked the block-spreading and block-de-spreading matrices given in equations (22) and (23), respectively, ensure mutual orthogonality among users, i.e., $C_u^H(i)C_{u'}(i)=I_K\delta(u-u')$ and $D_u^H(i)D_{u'}(i)=I_K\delta(u-u')$. In addition, one can arrive at equation (10) by substituting equations (22) and (23) into equation (20).

Figure 3:
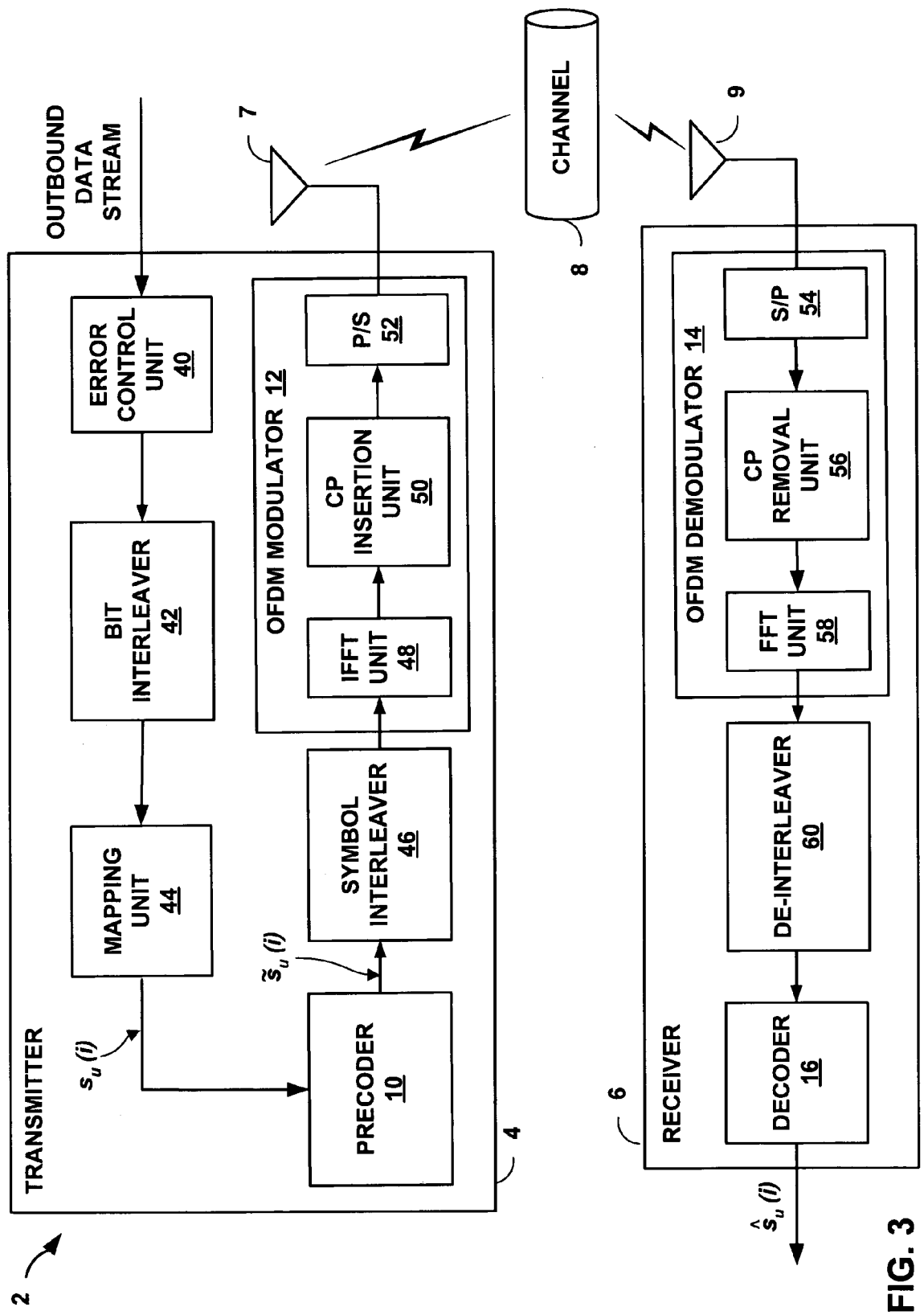
FIG. 3 is a block diagram illustrating in further detail one embodiment of a transmitter and a receiver of the multi-user communication system of FIG. 1.

FIG. 3 is a block diagram illustrating in further detail transmitter 4 and receiver 6 of multi-user communication system 2 of FIG. 1. Again, transmitter 4 and receiver 6 transmit data to receiver 6 through wireless channel 8 using UP-OFDMA techniques in accordance with an embodiment of the invention.

In the illustrated embodiment, transmitter 4 includes an error-control unit 40, a bit interleaver 42, a mapping unit 44, a precoder 10, a symbol interleaver 46, and an OFDM modulator 12. Initially, error-control unit 12 processes an outbound data stream, which represents a stream of information bits, and encodes the outbound data stream using EC coding. For example, error-control unit 12 may utilize conventional convolutional or turbo codes, or other applicable non-linear codes. Bit interleaver 42, processes the coded symbols and outputs permuted symbols. Mapping unit 44 receives the permuted symbols and maps the permuted symbols to constellation symbols. After constellation mapping, precoder 10 encodes successive blocks of K symbols by applying precoding matrix Θ as given in equation (12). Symbol interleaver 46 interleaves the encoded symbols to decorrelate channel 8 in the frequency domain. In other words, symbol interleaver 46 interleaves the frequency response of channel 8 across UP-OFDMA symbol blocks. When symbol interleaver 46 is sufficiently large and channel 8 has relatively fast variation, the interleaved channel response can be view as, at least approximately, as uncorrelated. On the other hand, when the size of symbol interleaver 46 is not sufficiently large, channel correlation should be taken into account. In any case, the output of symbol interleaver 46 is passed on to the OFDM modulator 12, which includes IFFT unit 48, CP insertion unit 50, and P/S converter 52. IFFT processes the output of symbol interleaver 46 to form UP-OFDMA blocks and CP insertion unit 50 inserts a CP for each so as to substantially reduce interblock interference (IBI). Finally, P/S converter 52 serializes the resulting blocks for transmission through wireless channel 8.

Receiver 6 includes OFDM demodulator 14, de-interleaver 60, and decoder 16. Again, receiver 6 receives a UP-OFDMA waveform via antenna 9, which is typically a function of the waveform at antenna 7 and channel 8. Demodulator 14 may include a S/P converter 54, CP removal unit 56 and FFT unit 58. S/P converter 54 samples the received waveform, buffers the discrete data, and groups the data to form blocks that are output to CP removal unit 56. CP removal unit discards the CP of the incoming blocks thereby producing blocks of K symbols and FFT unit 58 applies a FFT matrix to demodulate the data. De-interleaver 60 receives the post-FFT data, i.e., the demodulated data, from demodulator 14 and reassembles each block of encoded symbols that have been permuted in the frequency domain by symbol interleaver 46. Decoder 16 may apply turbo coding or other iterative decoding techniques to decode the non-redundant unitary precoded transmission provided by transmitter 4 to form estimates of the data. Again, transmitter 4 may be any wireless device, such as a mobile wireless device, and receiver 6 may be any receiving wireless device, such as a base station.

Figure 4:
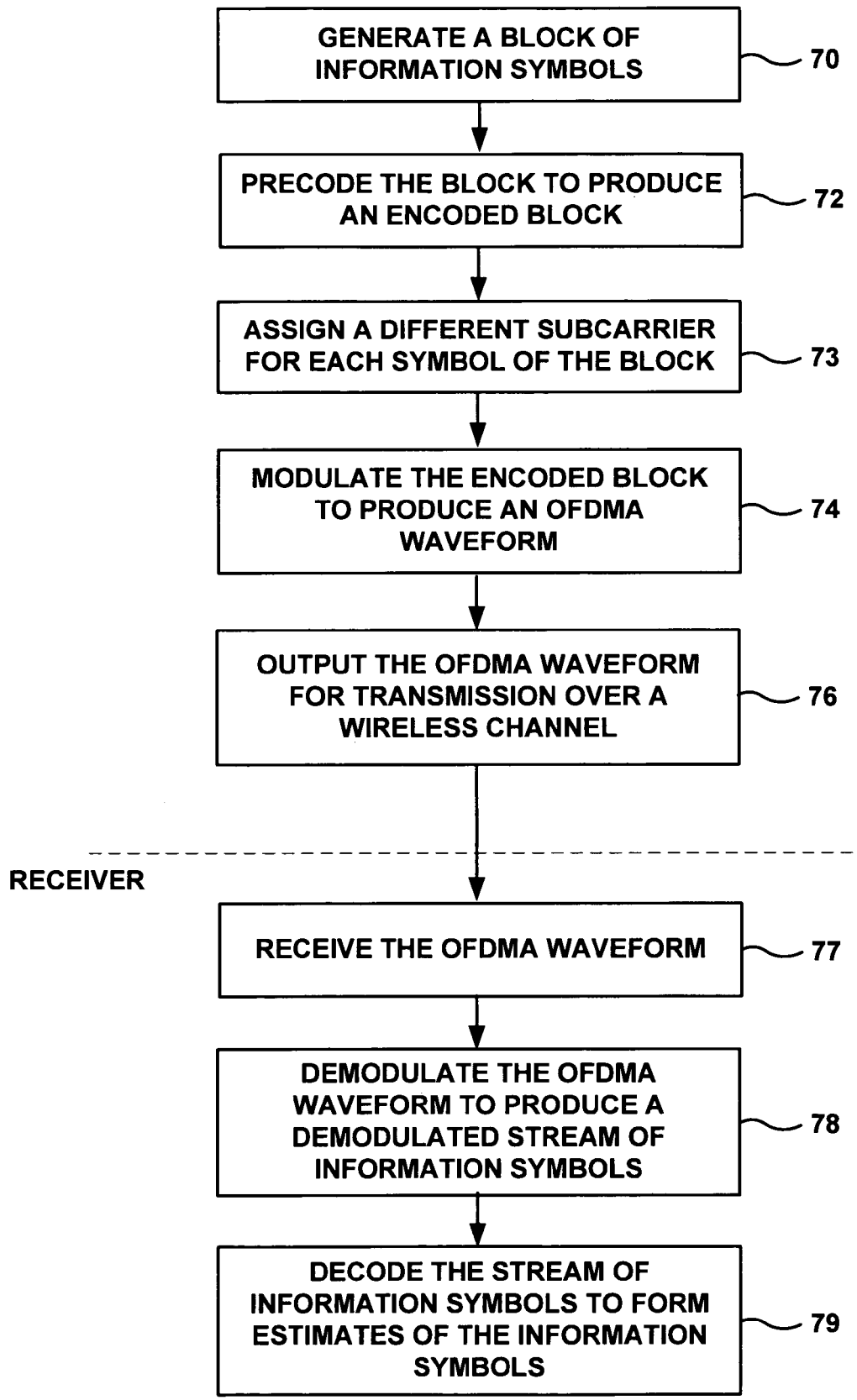
FIG. 4 is a flowchart illustrating exemplary operation of the transmitter and receiver of FIG. 2.

FIG. 4 is a flowchart illustrating an example mode of operation of communication system 2 of FIG. 1 in which transmitter 4 and receiver 6 communicate data through wireless channel 8 using the described UP-OFDMA techniques. Initially, transmitter 4 generates a block of information symbols (step 70) from a stream of information symbols. As described previously, generating the block of symbols may involve processing an outbound data stream of information bits. For example, error-control unit 12 may apply a convolutional code to produce coded symbols. Next, the coded symbols may be interleaved, for example by bit interleaver 44, to form permuted symbols which are then mapped to constellation symbols. After constellation mapping, transmitter 4 precodes the block of symbols to produce a corresponding encoded block (step 72) and assigns a different subcarrier for each symbol of the block (step 73). Specifically, precoder 10 may encode successive blocks of K symbols by applying preceding matrix Θ. An interleaver, such as symbol interleaver 46, may then interleave the symbols of the encoded block to decorrelate channel 8 in the frequency domain. In this case the output of symbol interleaver 46 is passed on to OFDM modulator 12 which modulates the encoded block to produce an OFDMA waveform (step 74). Specifically, OFDM modulator 12 may insert a CP so as to substantially reduce IBI and serialize the resulting block for transmission through wireless channel 8. Transmitter 4 then outputs the OFDMA waveform over wireless channel 8 (step 76). In this manner, transmitter 4 outputs the OFDMA waveform with constant modulus with high power and bandwidth efficiency.

Receiver 6 subsequently receives the OFDMA waveform (step 77) and demodulates the OFDMA waveform to produce a demodulated stream of information symbols (step 78). For example, receiver 6 may first sample the received OFDMA waveform to produce discrete data which is then grouped into blocks of appropriate size. When a CP has been inserted at transmitter 4, receiver 6 removes the corresponding CP to produce of a block of symbols. The resulting block of symbols may be demodulated by applying an FFT matrix to produce a demodulated stream of information symbols. Finally, receiver 6 decodes the stream of information symbols to form estimates of the information symbols (step 79). As described previously, receiver 6 may employ turbo coding or other iterative decoding techniques.

Figure 5:
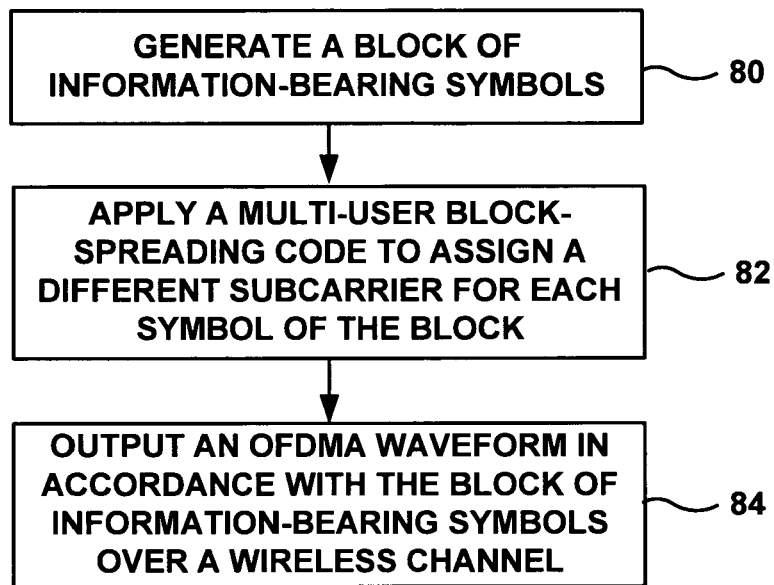
FIG. 5 is a flowchart illustrating exemplary operation of the transmitter and receiver of FIG. 3.
Figure 5:
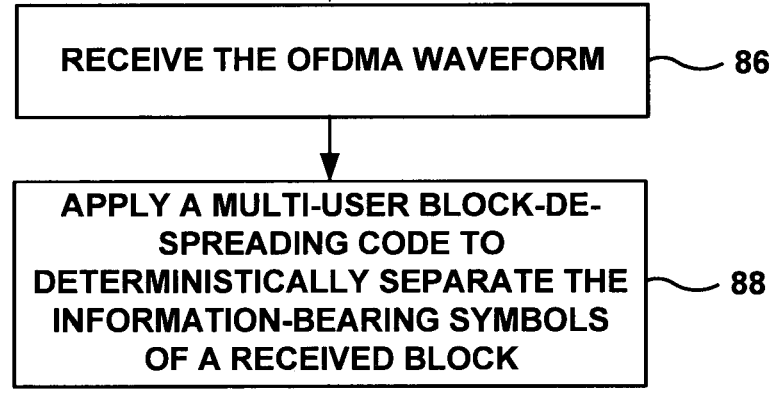

FIG. 5 is a flow chart illustrating an example mode of operation of communication system 2 of FIG. 2 in which transmitter 20 and receiver 30 communicate data through wireless channel 8 using a UP-OFDMA technique. Again, the UP-OFDMA technique utilized by transmitter 20 and receiver 30 is simply described from a block-spreading perspective rather than a multicarrier perspective, and is not different from the previously described UP-OFDMA techniques.

Initially, transmitter 20 generates a block of information symbols (step 80) from a stream of information symbols (step 82). Transmitter 20 then applies a multi-user block-spreading code to assign a different subcarrier for each symbol of the block. For example, block-spreading unit 22 may apply an orthogonal spreading code selected such that the information symbols also retain their orthogonality after passing through wireless channel 8. Furthermore, transmitter 20 may apply the multi-user spreading code such that the symbols have a constant modulus. In any case, transmitter 20 outputs an OFDMA waveform over wireless channel 8 (step 84). In some embodiments, transmitter 20 may also insert a CP for each block of information symbols so as to substantially reduce IBI, serialize the block of symbols, and pulse shape the serialized output to generate the OFDMA waveform with constant modulus.

Next, receiver 30 receives the OFDMA waveform (step 86) and applies a multi-user block-de-spreading code to deterministically separate the information symbols of the received block (step 88). In particular, receiver 30 may sample the received waveform to produce a stream of discrete data which is then grouped into appropriately sized blocks. When a CP has been inserted at transmitter 20, receiver 30 discards the corresponding CP before applying the block-de-spreading code. After applying the block-de-spreading code, estimates of the information symbols may be formed by utilizing a decoder, such as a single user equalizer, to decode de-spread symbols.

FIGS. 6-9 are graphs that illustrate the performance of the described UP-OFDMA techniques for a single user over various channel models. Previously, the performance of an uncoded UP-OFDMA system with high power and bandwidth efficiency has been described. We now demonstrate that unitary precoding also improves error performance considerably. Since error-control coding is normally employed in practical systems, we will analyze a convolutionally encoded UP-OFDMA system as illustrated in FIG. 3. For example, error control unit 40 may utilize convolutional coding (CC) in some embodiments. In the following paragraphs, we will analyze the performance of coded UP-OFDDMA to reveal the benefit induced by unitary precoding and also to quantify the power savings over conventional OFDMA in a simplified fading channel. In particular, we consider maximum-likelihood (ML) optimal decoding at receiver 6 to carry out the theoretical analysis. In practice, effective iterative (turbo) decoders may be employed. Compared to conventional OFDMA, the iterative receiver improves the performance of UP-OFDMA at the price of increased complexity. However, for small or moderate values of the block size K, the receiver complexity is quite affordable. A related performance analysis has also been carried out in the previously referenced paper authored by Z. Wang, S. Zhou, and G. B Giannakis for single-user OFDM systems in the presence of Rayleight fading channels. The following analysis the results of the previous analysis to UP-OFDMA and Ricean Fading.

Since signals from multiple users are separated at the receiver, we will, henceforth, focus on a single user only, and drop the user index u for notational brevity. Let $\underline{c}:=(c(0), c(1), c(2), \ldots)$ denote one realization of the coded bit sequence $\underline{s}:=(s(0), s(0), s(1), s(2), \ldots)$ the corresponding symbol sequence after bit interleaver 42 and mapping unit 44, and $y:=(y(0), y(1), y(2), \ldots)$ the received sequence after de-interleaving by de-interleaver 60. Similarly, let $\hat{\underline{c}}, \hat{\underline{s}}, \hat{y}$ the corresponding quantities for another realization.

Assume that $\underline{c}$ and $\hat{\underline{c}}$ differ in d bits. With bit interleaver 42 designed properly, these bits are scrambled such that no two bits fall into the same symbol block. This assumption is based on the fact that the block size K is small in practice, and its validity will be corroborated by simulation results. Suppose that after interleaving, those d different symbols, labeled as $s(n_1), s(n_2), \ldots, s(n_d)$ fall into blocks $s(b_1), s(b_2), \ldots, s(b_d)$ with $m_1, m_2, \ldots, m_d$ describing the positions of these symbols in their corresponding blocks. In other words, we have $n_w = b_w K + m$, and $s(n_w) = [s(b_w)]_{m_w}, \forall w \in [1, d]$. Define the precoded block as $\tilde{s}(b_w) = \Theta s(b_w)$, and let $\theta_k^T$ denote the kth row of Θ. The (k+1)st entry of is thus $[\tilde{s}(b_w)]_k = \theta_k^T s(b_w)$.

Dropping the user index in equation (10) and letting $\lambda(b_w K + k)$ denote the (k+1, k+1)st entry of the diagonal matrix $\Lambda(b_w)$, we can express the serial version of equation (10) as equation (24) where $k \in [0, K-1]$, and $w \in [1, d]$. Similarly, we have $\hat{y}(b_w K + k)$ corresponding to $\hat{\underline{s}}$.

$$y(b_w K+k)=\lambda(b_w K+k)\theta_k^T s(b_w)+w(b_w K+k) \quad (24)$$

Next, define $\bar{s}(b_w):=s(b_w)-\hat{s}(b_w)$ $\bar{y}(b_w K+k):=y(b_w K+k)-\hat{y}(b_w K+k)$. Notice that only one symbol discrepancy occurs in each of the d inconsistent blocks. Therefore $\bar{s}(b_w)=[0, \ldots, 0, \bar{s}(n_w), 0, \ldots, 0]^T$ and $\theta_k^T \bar{s}(b_w) = \theta_{k,m_u} \bar{s}(n_w)$, where $\theta_{k,m_u}$ is the (k+1, $m_w$+1)st entry of Θ. We can then express $\bar{y}(b_w K+k)$ according to equation (25).

$$\bar{y}(b_w K+k)=\lambda(b_w K+k)\theta_{k,m_u}\bar{s}(n_w) \quad (25)$$

Each single error $\bar{s}(n_w)$ will lead to K different received symbols through K subcarriers. This intuitively explains why precoding enables full multipath diversity.

Other than the differences introduced by $\{\bar{s}(n_w)\}_{w=1}^{d}$, the received sequences $\underline{y}$ and $\hat{\underline{y}}$ are the same. The Euclidean distance between $\underline{y}$ and $\hat{\underline{y}}$ can be found according to equation (26), where $\delta$ is the minimum distance between any two symbols in the adopted signal constellation. The derivation of equation (26) takes into account that each entry of $\Theta$ has amplitude $1/\sqrt{K}$. Thus, for each channel realization, the conditional pairwise error probability that $\hat{\underline{c}}$ is decided when $\underline{c}$ is actually transmitted, can be upper bounded in accordance with equation (27).

$$D^2(\underline{y}, \hat{\underline{y}}) = \sum_{w=1}^{d} \sum_{k=0}^{K-1} |\lambda(b_w K + k)\theta_{k,m_w}\bar{s}(n_w)|^2 \quad (26)$$

$$\geq \frac{\delta^2}{K} \sum_{w=1}^{d} \sum_{k=0}^{K-1} |\lambda(b_w K + k)|^2$$

$$P_E\{\underline{c} \to \hat{\underline{c}} | \text{channel}\} = Q\left(\sqrt{\frac{D^2(\underline{y}, \hat{\underline{y}})}{2N_0}}\right) \quad (27)$$

$$\leq Q\left(\sqrt{\frac{\delta^2\left(\sum_{w=1}^{d} \sum_{k=0}^{K-1} |\lambda(b_w K + k)|^2\right)}{2KN_0}}\right)$$

This conditional pairwise error probability needs to be averaged over all channel realizations. Therefore, we need to find the probability distribution of each channel value $\lambda(b_w K+k)$, as well as the correlations of those channel values across different blocks and sub carriers.

Rayleigh fading on each FIR channel tap is usually assumed for simplicity. Ricean fading, however, is more general, in that it includes Rayleigh fading as a special case when no line-of-sight (LOS) is present. Specifically, we will assume that the first nonzero channel tap (corresponding to the LOS signal) for each user is modeled as Ricean faded, while the remaining channel taps are Rayleigh faded and uncorrelated. The channel's frequency response values $\lambda(b_w K+k)$ will be Ricean faded with the same Ricean factors $\kappa$ across different subcarriers. In practice, due to the transmit—receive filters and chip-rate sampling, more than one channel tap may be Ricean faded even when only one physical LOS path is present. In such a case, $\lambda(b_w K+k)$ will be Ricean faded with carrier-specific Ricean factors. For illustration purposes, we will adopt the simple Ricean fading channel model, assuming that the frequency response values on the K subcarriers of each user are independently and identically Ricean faded.

Since the coded bit sequence will be transmitted over multiple blocks, we also need to consider the channel frequency response across different blocks. In mobile communication systems, the channels are slowly varying due to the terminal mobility, or the changing scattering environment. Symbol interleaver 46 offers an effective means of improving performance in slowly fading channels by interleaving the frequency response of the channel across UP-OFMDA blocks. However, the interleaving depth is usually limited in many delay-sensitive applications, such as voice and certain data communication systems. In the following, we consider two extreme cases.

The first case includes uncorrelated fading channels with channel frequency responses uncorrelated from block to block, assuming that the interleaving depth is sufficiently large and the channels vary relatively fast. The second case includes block fading channels that are time invariant from block to block, assuming a static channel and no interleaving. These two models are rather idealistic, and practical systems employing limited interleaving will demonstrate a performance in between these extreme cases. However, through the study of these two extreme cases, we will illustrate the benefit of unitary precoding, and quantify the power savings of UP-OFDMA relative to conventional OFDMA, as well as the performance gap between UP-OFDMA and the single-user bound. This analysis provides theoretical insights and, more importantly, it offers practical guidelines for choosing the block size K.

In uncorrelated fading channels, frequency response on the subcarriers are Ricean distributed with Ricean factor $\kappa$, and they are uncorrelated from subcarrier to subcarrier, and from block to block. When $\kappa=0$, this channel model is driven by Rayleigh fading. Using the Chernoff bound $Q(\chi) \leq 0.5 \exp(-\chi^2/2)$ and averaging over random channels described in J. G. Proakis, *Digital Communications*, 4th ed. New York: McGraw-Hill, 2000 and M. K. Simon and M.-S. Alouini, *Digital Communications Over Fading Channels: A Unified Approach to Performance Analysis*. New York: Wiley, 2000, we arrive at the average pairwise error probability given in equation (28), where $\gamma_1 := 1+\kappa+\delta^2/(4KN_0)$. The union bound on the bit-error rate (BER) can then be expressed according to equation (29), where the $(B_d, d)$ is the bit distance spectrum of a CC described in S. Benedetto and E. Biglieri, Principles of Digital Transmission With Wireless Applications. New York: Kluwer/Plenum, 1999.

$$P_E(d) := P_E\{\underline{c} \to \hat{\underline{c}}\} \quad (28)$$

$$\leq \frac{1}{2}\left(\frac{1+\kappa}{\gamma_1} \cdot e^{-\kappa(1-(K+1)/\gamma_1)}\right)^{Kd}$$

$$P_b \leq \sum_{d=d_f}^{\infty} B_d P_E(d) \quad (29)$$

$$= \frac{1}{2} \sum_{d=d_f}^{\infty} B_d \left(\frac{1+\kappa}{\gamma_1} \times e^{-\kappa(1-(k+1)/\gamma_1)}\right)^{Kd}$$

At sufficiently high SNR, $P_b \sim (\gamma_1)^{-Kd_f}$ indicates that the diversity order of the described UP-OFDMA is $Kd_f$, which amounts to a multiplicative diversity order enhancement due to precoding at the transmitter. The special case with K=1 reduces to conventional OFCMA with CC.

For $K \geq 2$, we define the SNR gain $G_K$ as the reduction in SNR that is afforded by UP-OFDMA to achieve the same error performance as the conventional OFDMA. Targeting this prescribed performance, let $\delta_1$ and $\delta_K$ be the minimum constellation distance needed for OFDMA and UP-OFDMA, respectively. The SNR gain $G_K$ can be obtained by equating the average performance in equation (29) for both systems. Since nonlinear equations must be solved to obtain $G_K$, no closed form is possible. However, this could be circumvented by approximating the Ricean-$\kappa$ distribution using the Nakagami-m distribution, with the two factors related as $m=(1+K)^2/(1+2K)$, where $\kappa \geq 0$ and $m \geq 1$. Recall that Rayleigh fading corresponds to $m=1$. Hence, in a similar way, we average the pairwise error probability again using the Nakagami distribution thereby yielding equation (30). And similarly, the BER is upper bounded by (31).

$$P_E(d) \le \frac{1}{2}\left(1 + \frac{\delta^2}{4mKN_0}\right)^{-mKd} \quad (30)$$

$$P_b \le \frac{1}{2}\sum_{d=d_f}^{\infty} B_d\left(1 + \frac{\delta^2}{4mKN_0}\right)^{-mKd}. \quad (31)$$

We verify that two bounds in equations (29) and (31) are almost identical for the error rates considered, e.g., below $10^{-6}$. Therefore, approximating the Ricean distribution using the Nakaga-m distribution is well justified, and allows us to find $G_K$ in closed form.

Substituting $\delta_1$ and $\delta_K$ into equation (31) for OFDMA and UP-OFDMA, the SNR gain to achieve the same performance can be readily expressed in accordance with equation (32).

$$G_K = \frac{\delta_1^2}{\delta_K^2} \quad (32)$$

$$= \frac{\delta_1^2}{4mKN_0\left[\left(1 + \frac{\delta_1^2}{4mN_0}\right)^{1/K} - 1\right]}.$$

We now quantify the performance gap of UP-OFDMA with respect to the single-user bound. We assume a rich scattering environment, where the L+1 channel taps are uncorrelated. The performance of SS-OFDM can be achieved with only L+1 equi-spaced subcarriers. Therefore, the single-user bound as previously described can be quantified by setting K=L+1 in equations (29) and (31). As a result, we define the SNR gap between UP-OFDMA and the single-user bound according to equation (33).

$$\varepsilon_K := \frac{\delta_K^2}{\delta_{L+1}^2} \quad (33)$$

$$= \frac{K\left[\left(1 + \frac{\delta_1^2}{4mN_0}\right)^{1/K} - 1\right]}{(L+1)\left[\left(1 + \frac{\delta_1^2}{4mN_0}\right)^{1/(L+1)} - 1\right]}$$

Figure 6:
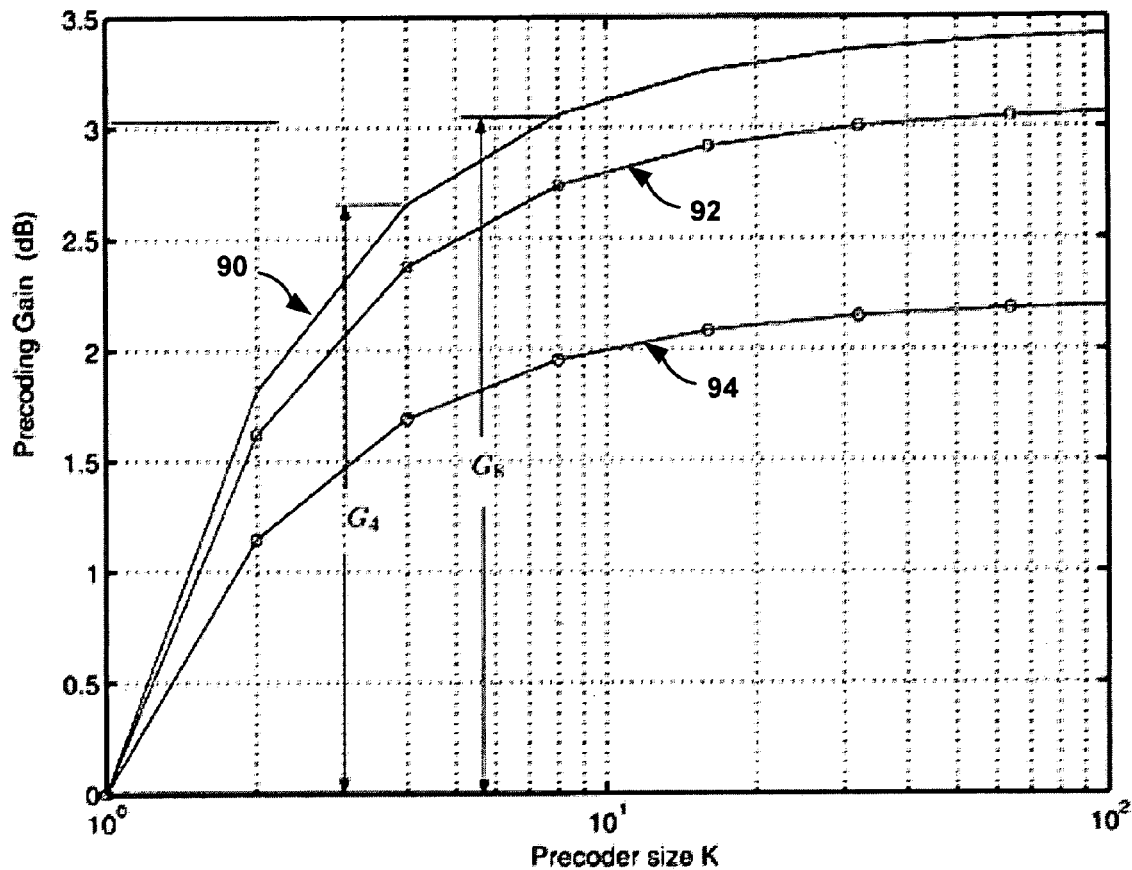
FIG. 6 is graph illustrating a signal-to-noise ratio (SNR) gain of UP-OFDMA transmissions versus OFDMA transmissions.

FIG. 6 illustrates the SNR gain $G_K$ for different block sizes and typical values of the Nakagami factor m (or the Ricean factor κ), where we set $\delta_1^2/N_0=11$ dB, which amounts to $E_b/N_0=6.7$ dB for a rate 2/3 code and binary PSK modulation. By examining FIG. 6, it is evident that $G_K$ saturates quickly as K increases. Most performance improvement is observed for K≦10. The SNR gain of the single-user SS-OFDM over conventional OFDMA can be found in FIG. 6 by setting K=L+1. For all m's, i.e. m=1 (plot 90), m=1.2 (plot 92), and m=2 (plot 94), the additional performance improvement by increasing K=4 to K=L+1 (the single-user bound) is less than 1 dB, even for very large L. For sparse channels with small $\hat{L}_u$, the performance gap decreases further, since those L+1 taps become highly correlated. We therefore conclude that UP-OFDMA (with K≧4) is significantly effective, with each user having performance close to the single-user bound. Also, notice that the single-user bound, as well as the SNR gap $\varepsilon_k$, decreases as m increases; i.e., when the channel condition improves.

From a BER perspective, K should be chosen as large as possible. However, in practice, the choice of K is limited by many factors. First, the channel must be ensured time invariant during each block of duration $(NK+L)T_c$. Increasing K unrestrictedly can render this assumption no longer valid. Second, the decoding complexity increases when K increases. Furthermore, for sparse channels with small $\hat{L}_u$, the K subcarriers of each user will be highly correlated if K≧$L_u$. All these motivate and well justify choosing a small K for UP-OFDMA. In practice, K can be chosen to be smaller than 12, e.g., K=4 or K=8. As illustrated in FIG. 6, the performance gap from the single-user bound when K=4 and K=8 is less than 1 dB in the presence of ideal uncorrelated fading channels.

In block fading channels, we assume that the link remains time invariant across blocks. And we also assume that interleaving and/or FH are not used, so that multipath diversity is not fully enabled by UP-OFDMA. For such a setup, the pairwise error probability can be similarly bounded in accordance with equation (34), where $\gamma_2:=1+K+d\cdot\delta^2/(4KN_0)$. The union bound on the BER can then be expressed according to equation (35).

$$P_E(d) := P_E\{c \to \hat{c}\} \quad (34)$$

$$\le \frac{1}{2}\left(\frac{1+\kappa}{\gamma_2} \times e^{-\kappa(1-(\kappa+1)/\gamma_2)}\right)^K$$

$$P_b \pounds \sum_{d=d_f}^{\infty} B_d P_E(d) = \frac{1}{2}\sum_{d=d_f}^{\infty} B_d\left(\frac{1+\kappa}{\gamma_2} \times e^{-\kappa(1-(\kappa+1)/\gamma_2)}\right)^K. \quad (35)$$

In this case, the diversity order is K, much less than in the uncorrelated fading scenario. In such cases, CC only contributes to the coding gain rather than the diversity gain. The performance of such systems will suffer from limited diversity. For example, when K=1, the diversity of conventional OFDMA is only one. When the channel has a deep null on the assigned subcarrier, he transmitted signals can not be recovered. This highly motivates FH to benefit from multipath diversity, and coding together with interleaving to enable time diversity. Antenna (or space) diversity is another form of diversity that can be incorporated easily in our UP-OFDMA system. Since for this case, it is difficult to obtain the SNR gain in closed form, simulations will be used to verify the performance improvement.

Figure 7:
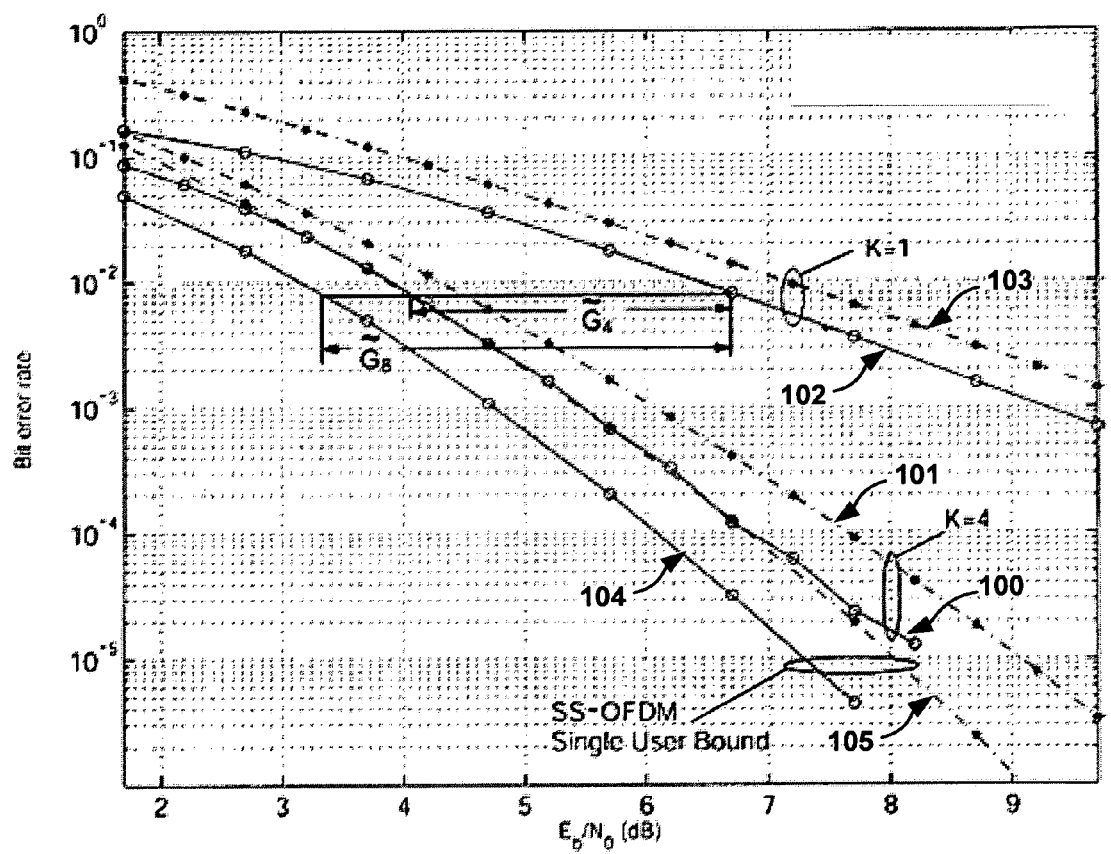
FIGS. 7-9 are graphs that illustrate exemplary results of simulations of the described UP-OFDMA techniques.
Figure 8:
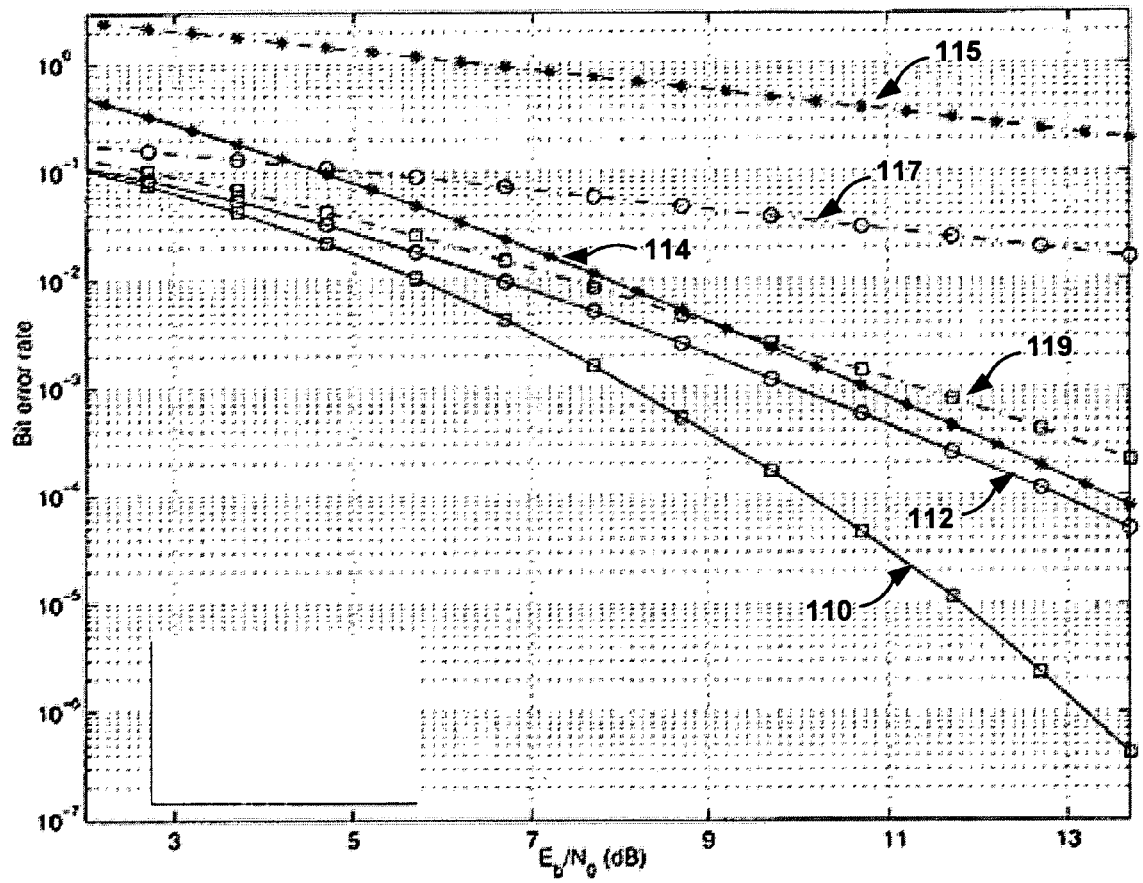
Figure 9:
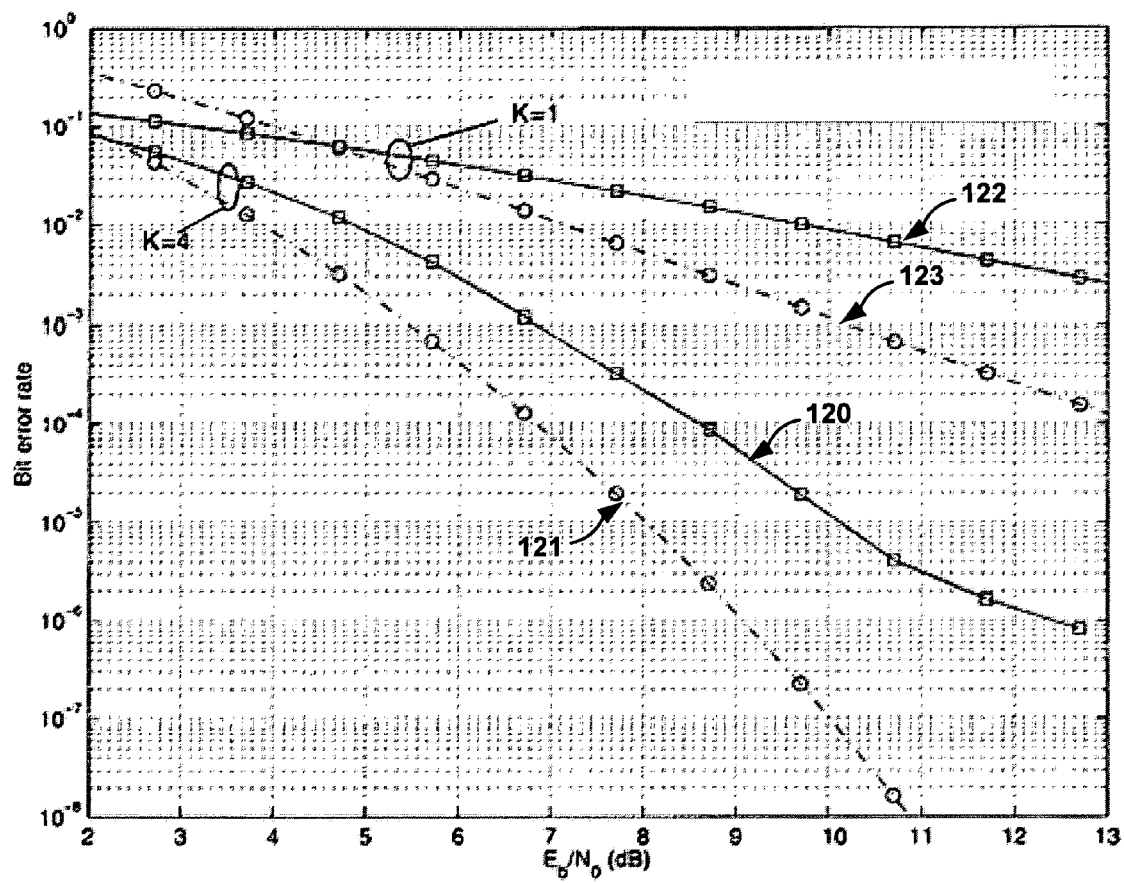

FIGS. 7-9 are graphs that illustrate exemplary results of simulations of the described UP-OFDMA techniques. In general, the simulations were executed with P=64 subcarriers in the system and K=4 subcarriers allocated per user. A rate 2/3 CC with generator polynomial [3 1 0; 2 3 3], and bit distance spectrum polynomial $B(z)=0.5z^3+3z^4+8z^5+23z^6+\ldots$ is used for the simulations. In addition, binary PSK modulation is used and each frame contains 192 information bits. A block interleaver, such as bit interleaver 42, of dimension 18×16 is also employed. At the receiver, the turbo decoding algorithm described in the previously referenced paper authored by Z. Wang, S. Zhou, and G. B. Giannakis is employed. For all simulations, the BER after three iterations is plotted.

FIG. 7 is a graph that illustrates simulated performance of the described UP-OFDMA techniques with various precoder sizes K in uncorrelated fading channels. In particular, the uncorrelated fading channel is modeled as a rich scattering environment with the channels independently Rayleigh faded from block to block, i.e. an idealized fast fading scenario that can be approximated through sufficiently long interleaving together with FH. The simulated BER of UP-OFDMA with K=4 (plot 100) is plotted against conventional OFDMA with K=1 (plot 102). In addition, performance of single-user SS-OFDM is plotted with an underlying FIR channel of length eight (plot 104). For reference the upper bounds given in equation (29) are also plotted for each of UP-OFDMA, conventional OFDMA, and SS-OFDMA (plots 101, 103, and 105), respectively.

In FIG. 6, we illustrated the SNR gain GK analytically from equation (32). Alternatively, we can also estimate those SNR gains through Monte-Carlo simulations. Actually, the estimates can be read directly from FIG. 7. For example, when $E_b/N_0$=6.7 dB and m=1, the closed-form expression given in equation (31) predicts $G_4$=2.6 dB and $G_8$=3.0 dB, while Monte-Carlo simulations estimate $\tilde{G}_4$=2.6 dB and $\tilde{G}_8$=3.3 dB. The fact that analytical and simulation-based results are very close demonstrates that the approximation given in equation (32) is sufficiently accurate.

FIG. 8 is a graph that illustrates simulated performance of the described UP-OFDMA techniques with precoder size K=4 in block fading channels. In particular, we consider a block-fading channel with 14 independent taps, and channels assumed to be constant per frame. BER curves of UP-OFDMA, with FH (plot 110) and without FH (plot 112) fall within 0.5 dB of the union bound (plot 114). For conventional OFDMA, with FH (plot 1190) and without FH (plot 117), the union bound (plot 119) becomes quite loose. Again, substantial performance improvement is observed, due to unitary precoding. Compared with the perfect interleaving case illustrated in FIG. 6, the performance suffers due to lack of time diversity. To fully exploit multipath diversity, FH is also simulated here with the hopping pattern selected according to equation (11). Again, UP-OFDMA significantly improves performance over conventional OFDMA considerably.

FIG. 9 is a graph that illustrates simulated performance of the described UP-OFDMA techniques with precoder size K=4 in a correlated fading channel. BER curves for simulated UP-OFDMA (plot 120) and the union bound (plot 121) are illustrated as well as BER curves for simulated conventional OFDMA (plot 122) and the corresponding union bound (123). Since we have verified our analysis for the two extreme cases, we investigate practical slow fading channels with symbol interleaver 42 having limited depth. We consider a correlated fading channel with L+1=8 equi-powered channel taps. The carrier frequency is 5 GHz and the mobile velocity is 3 m/s, which results in a Doppler frequency of $f_m$=50 Hz. The channel coherence time can be computed as $\tau_c \approx 0.423/f_m$=8.5 ms. The chip rate in the simulation is taken as 1.152 MHz with chip duration $T_c$=0.87 μs. For symbol interleaver 42, we study a block interleaver of size 144×128, inducing a delay of 16 ms≈$2\tau_c$. Under this practical channel, UP-OFDMA achieves a SNR improvement of approximately 7 dB, even for a high BER of 3×10$^{-3}$. FIG. 9 also illustrates that correlated fading incurs considerable performance loss relative to the ideal scenario with uncorrelated channels.

Various embodiments of the invention have been described. The described techniques can be embodied in a variety of receivers and transmitters including base stations, cell phones, laptop computers, handheld computing devices, personal digital assistants (PDA's), and the like. The devices may include a digital signal processor (DSP), field programmable gate array (FPGA), application specific integrated circuit (ASIC) or similar hardware, firmware and/or software for implementing the techniques. If implemented in software, a computer readable medium may store computer readable instructions, i.e., program code, that can be executed by a processor or DSP to carry out one of more of the techniques described above. For example, the computer readable medium may comprise random access memory (RAM), read-only memory (ROM), non-volatile random access memory (NVRAM), electrically erasable programmable read-only memory (EEPROM), flash memory, or the like. The computer readable medium may comprise computer-readable instructions that when executed in a wireless communication device, cause the wireless communication device to carry out one or more of the techniques described herein. These and other embodiments are within the scope of the following claims.

The invention claimed is:

1. A method comprising:
generating a block of information-bearing symbols from a stream of information-bearing symbols;
applying, in a transmitter device, a multi-user block-spreading code to the block of information-bearing symbols to assign a different subcarrier for each symbol of the block, wherein the number of information-bearing symbols per block is equal to the number of subcarriers assigned per user, wherein the number of information-bearing symbols per block is equal to K, wherein K is selected so that each block has a duration (NK+L)$T_c$ that is time invariant, and wherein K subcarriers are assigned per user, N is the number of users, L is a function of the channel order, and $T_c$ is the chip period; and
outputting an orthogonal frequency division multiple access (OFDMA) waveform for transmission through a wireless channel, wherein each information-bearing symbol is output according to the different subcarrier assigned by the block-spreading code.

2. The method of claim 1, further comprising selecting the subcarriers for each user to limit a correlation between subcarriers.

3. The method of claim 2, wherein selecting the subcarriers comprises selecting equi-spaced subcarriers.

4. The method of claim 1, wherein applying the multi-user block-spreading code comprises applying an orthogonal spreading code selected so that the information symbols retain their orthogonality after passing through the wireless channel.

5. The method of claim 1, wherein the total number of subcarriers is equal to P, and applying the multi-user block-spreading code comprises applying a P×K spreading matrix so that the information symbols retain their orthogonality after passing through a frequency selective communication channel.

6. The method of claim 1, wherein outputting an OFDMA waveform further comprises inserting a cyclic prefix of length L for each block of information-bearing symbols.

7. The method of claim 1, wherein the wireless channel is frequency selective.

8. The method of claim 1,
wherein applying the multi-user block-spreading code comprises applying an orthogonal spreading code selected such that the symbols have a constant modulus, and
wherein outputting the OFDMA waveform comprises outputting the OFDMA waveform with the constant modulus.

9. The method of claim 1, wherein generating a block of information symbols further comprises:
applying an error-control code to the chips of the information bearing symbols, wherein the chips corresponding to the information-bearing symbols are interleaved; and
constellation mapping the information-bearing symbols.

10. The method of claim 1, further comprising:
receiving the OFDMA waveform over the wireless channel; and
applying a multi-user block-de-spreading code to the OFDMA waveform to deterministically separate the information-bearing symbols within a received block.

11. The method of claim 10, wherein the total number of subcarriers is P, and applying the multi-user block-de-spreading code comprises applying a K×P de-spreading matrix to the received OFDMA waveform to produce K information-bearing symbols.

12. A method comprising:
generating a block of information-bearing symbols from a stream of information-bearing symbols;
precoding the block to produce an encoded block;
assigning, in a transmitter device, a different subcarrier for each symbol of the block, wherein the number of information-bearing symbols is equal to the number of subcarriers assigned per user, wherein the number of information-bearing symbols per block is equal to K, wherein K is selected so that each block of duration $(NK+L)T_c$ is time invariant, and wherein K subcarriers are assigned per user, N is the number of users, L is a function of the channel order, and $T_c$ is the chip period;
modulating the encoded block to produce an orthogonal frequency-division multiple access (OFDMA) waveform; and
outputting the OFDMA waveform in accordance with the encoded block over a wireless channel.

13. The method of claim 12, wherein assigning a different subcarrier for each symbol of the block comprises selecting the subcarriers for each user to limit a correlation between subcarriers.

14. The method of claim 13, wherein assigning a different subcarrier for each symbol of the block comprises selecting equi-spaced subcarriers.

15. The method of claim 12, wherein precoding the block comprises applying a unitary K×K matrix to the block, wherein the matrix is given according to the following equation:

$$\Theta = F_K \bar{\Delta},$$

where $F_K$ is a K×K Fast Fourier Transform matrix and $\bar{\Delta}$ is a diagonal matrix with unit amplitude diagonal entries.

16. The method of claim 12, wherein precoding the block comprises applying a matrix to a symbol vector formed by the block of information-bearing symbols, wherein applying the matrix to the symbol vector comprises performing matrix-vector multiplication in the complex field.

17. The method of claim 12, further comprising interleaving the symbols of the precoded block.

18. The method of claim 12, wherein the wireless channel is frequency selective.

19. The method of claim 12, wherein precoding the block of information-bearing symbols comprises encoding the block across the assigned subcarriers so that the information-bearing symbols have a constant modulus.

20. The method of claim 12,
wherein modulating the encoded block comprises modulating the encoded block to produce the OFDMA waveform so that the symbols have a constant modulus, and
wherein outputting the OFDMA waveform comprises outputting the OFDMA waveform with the constant modulus.

21. The method of claim 12, wherein outputting an OFDM waveform further comprises inserting a cyclic prefix of length L for each block of information-bearing symbols.

22. The method of claim 12, wherein generating a block of information symbols further comprises:
applying an error-control code to the chips of the information bearing symbols, wherein the chips corresponding to the information-bearing symbols are interleaved; and
constellation mapping the information-bearing symbols.

23. The method of claim 12, further comprising:
receiving the OEDMA waveform over the wireless channel;
demodulating the received OFDMA waveform to produce a demodulated stream of information-bearing symbols; and
decoding the information-bearing symbols to form estimates of the information-bearing symbols.

24. A wireless communication device comprising:
a precoder that encodes a block of information-bearing symbols, wherein a different subcarrier is assigned for each symbol of the block and the number of information-bearing symbols is equal to the number of subcarriers assigned per user, wherein the number of information-bearing symbols per block is equal to K, wherein K is selected so that each block of duration $(NK+L)T_c$ is time invariant, and wherein K subcarriers are assigned per user, N is the number of users, L is a function of the channel order, and $T_c$ is the chip period; and
an orthogonal frequency-division multiplexing (OFDM) modulator to produce an orthogonal frequency-division multiple access (OFDMA) waveform in accordance with the encoded block for transmission over a wireless channel.

25. The wireless communication device of claim 24, wherein the subcarriers for each user are selected to limit the correlation between subcarriers.

26. The wireless communication device of claim 25, wherein the subcarriers for each user are equi-spaced.

27. The wireless communication device of claim 24, wherein the precoder applies a unitary K×K matrix to the block, wherein the matrix is given according to the following equation:

$$\Theta = F_K \bar{\Delta},$$

where $F_K$ is a K×K Fast Fourier Transform matrix and $\bar{\Delta}$ is a diagonal matrix with unit amplitude diagonal entries.

28. The wireless communication device of claim 24, wherein the precoder applies a matrix to a symbol vector formed by the block of information-bearing symbols, wherein applying the matrix to the symbol vector comprises performing matrix-vector multiplication in the complex field.

29. The wireless communication device of claim 24, further comprising an interleaver to interleave the symbols of the precoded block.

30. The wireless communication device of claim 24, wherein the wireless channel is frequency selective.

31. The wireless communication device of claim 24, wherein the precoder encodes the block across the assigned subcarriers such that the information-bearing symbols have a constant modulus.

32. The wireless communication device of claim 24, wherein the precoder encodes the block such that the symbols have a constant modulus, and wherein the OFDM modulator generates the OFDMA waveform with the constant modulus.

33. The wireless communication device of claim 24, wherein the OFDM modulator modulates the encoded block to produce the OEDMA waveform by applying an inverse Fast Fourier Transform (IFFT) matrix of size P, wherein P is the total number of subcarriers.

34. The wireless communication device of claim 24, wherein the OFDM modulator inserts a cyclic prefix of length L for each block of information-bearing symbols.

35. The wireless communication device of claim 24, further comprising:
- an error-control coding unit to apply an error-control code to the chips of the information-bearing symbols, wherein the chips corresponding to the information-bearing symbols are interleaved; and
- a mapping unit to perform constellation mapping on the information-bearing symbols.

36. The wireless communication device of claim 24, wherein the wireless communication device comprises a mobile device.

37. A computer-readable medium comprising instructions to cause a programmable processor to:
- generate a block of information-bearing symbols from a stream of information-bearing symbols;
- precode the block to produce an encoded block;
- assign a different subcarrier for each symbol of the block, wherein the number of information-bearing symbols is equal to the number of subcarriers assigned per user, wherein the number of information-bearing symbols per block is equal to K, wherein K is selected so that each block of duration $(NK+L)T_c$ is time invariant, and wherein K subcarriers are assigned per user, N is the number of users, L is a function of the channel order, and $T_c$ is the chip period;
- modulate the encoded block to produce an orthogonal frequency-division multiple access (OFDMA) waveform; and
- transmit the OFDMA waveform over a wireless channel, wherein each information-bearing symbol is output according to the assigned subcarrier.

38. A system comprising:
- a transmitter that precodes a block of information-bearing symbols to produce an encoded block, assigns a different subcarrier for each symbol of the block, and outputs an orthogonal frequency-division multiple access (OFDMA) waveform in accordance with the precoded block over a wireless channel, wherein the number of information-bearing symbols is equal to the number of subcarriers assigned per user and each information-bearing symbol is output according to the assigned subcarrier, wherein the number of information-bearing symbols per block is equal to K, wherein K is selected so that each block of duration $(NK+L)T_c$ is time invariant, and wherein K subcarriers are assigned per user, N is the number of users, L is a function of the channel order, and $T_c$ is the chip period; and
- a receiver that receives the OFDMA waveform and produces a stream of estimated symbols.

* * * * *

UNITED STATES PATENT AND TRADEMARK OFFICE
CERTIFICATE OF CORRECTION

PATENT NO. : 7,672,384 B2
APPLICATION NO. : 11/070855
DATED : March 2, 2010
INVENTOR(S) : Georgios B. Giannakis, Shengli Zhou and Pengfei Xia It is certified that error appears in the above-identified patent and that said Letters Patent is hereby corrected as shown below:

Title Page

(75) Inventors: says "Shengli Zhou, Ashton, CT", should say -- Shengli Zhou, Mansfield, CT --

(75) Inventors: says "Pengfei Xia, Saint Paul, MN", should say -- Pengfei Xia, Minneapolis, MN --

In the Specification

Statement Regarding Federally Sponsored Research for Development, Column 1, line 14: says "awarded by the awarded by", should say -- awarded by --

Detailed Description, Equation, Column 4, line 26: says "[0, $N$-1]; [●]$_p$", should say -- [0, $N$-1]; . [●]$_p$ --

Detailed Description, Column 4, line 59: says "unitary preceding", should say -- unitary precoding --

Detailed Description, Equation, Column 6, line 21: says " $h_{\nu,\iota}(n):=(\varphi_{\nu,\iota}(t)*g_{\nu,\iota}(t)*\overline{\varphi}_{\nu,\iota}(t))|t-nT_c, n \in [0,L]$ ", should say -- $h_{\nu,\iota}(n) = (\varphi_{\nu,\iota}(t)*g_{\nu,\iota}(t)*\overline{\varphi}_{\nu,\iota}(t))|t = nT_c, n \in [0,L]$ --

Detailed Description, Equation, Column 6, line 38: says "$\tau_{u,i}$", should say -- $\tau_{u,l}$ --

Detailed Description, Equation, Column 8, line 9: says "$U \geqq 2$", should say -- $U \geq 2$ --

Signed and Sealed this
Twenty-ninth Day of December, 2015

Michelle K. Lee
*Director of the United States Patent and Trademark Office*

CERTIFICATE OF CORRECTION (continued)
U.S. Pat. No. 7,672,384 B2

Detailed Description, Equation, Column 9, line 20: says "$J \geqq K + L$", should say -- $J \geq K + L$ --

Detailed Description, Column 9, line 21: says "linear preceding", should say -- linear precoding --

In the Claims

Claim 21, Column 23, line 65: says "OFDM", should say -- OFDMA --

Claim 23, Column 24, line 8: says "OEDMA", should say -- OFDMA --

Claim 33, Column 24, line 65: says "OEDMA", should say -- OFDMA --